United States Patent
Islam et al.

(10) Patent No.: US 12,349,086 B2
(45) Date of Patent: Jul. 1, 2025

(54) PHYSICAL BROADCAST CHANNEL AND SYNCHRONIZATION SIGNAL BLOCK SIGNALING

(71) Applicant: QUALCOMM Incorporated, San Diego, CA (US)

(72) Inventors: Muhammad Nazmul Islam, Littleton, MA (US); Yongjun Kwak, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/661,248

(22) Filed: Apr. 28, 2022

(65) Prior Publication Data

US 2023/0354223 A1    Nov. 2, 2023

(51) Int. Cl.
*H04W 56/00* (2009.01)
*H04L 5/00* (2006.01)
*H04L 27/26* (2006.01)

(52) U.S. Cl.
CPC ......... *H04W 56/001* (2013.01); *H04L 5/0051* (2013.01); *H04L 27/2605* (2013.01)

(58) Field of Classification Search
CPC ............... H04W 56/001; H04L 5/0051; H04L 27/2605; H04L 27/2602; H04L 27/261; H04L 5/0048
USPC ........................................ 370/310, 328, 329
See application file for complete search history.

(56) References Cited

U.S. PATENT DOCUMENTS

| | | | | |
|---|---|---|---|---|
| 2020/0084737 A1* | 3/2020 | Lee | ....................... | H04L 5/0094 |
| 2020/0163054 A1* | 5/2020 | Liu | ..................... | H04L 27/2628 |
| 2020/0351924 A1* | 11/2020 | Seo | ........................ | H04L 5/0053 |
| 2021/0045144 A1* | 2/2021 | Kim | ...................... | H04W 72/30 |
| 2021/0360546 A1* | 11/2021 | Liu | ...................... | H04W 24/08 |
| 2022/0061105 A1* | 2/2022 | He | ........................ | H04W 72/23 |

FOREIGN PATENT DOCUMENTS

JP    2022011324 A    1/2022

OTHER PUBLICATIONS

International Search Report and Written Opinion—PCT/US2023/064621—ISA/EPO—Jun. 20, 2023.
Nokia et al., "Initial Access for REDCAP UEs", 3GPP Draft, 3GPP TSG-RAN WG1 Meeting #103-e, R1-2008072, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020, XP051939452, 6 Pages, p. 4, paragraph 2.2, 2.3, table 2.

* cited by examiner

*Primary Examiner* — Obaidul Huq
(74) *Attorney, Agent, or Firm* — Harrity & Harrity, LLP

(57) ABSTRACT

Various aspects of the present disclosure generally relate to wireless communication. In some aspects, a user equipment (UE) may receive a synchronization signal block (SSB) burst set that includes a plurality of SSBs, a majority of the SSBs in the SSB burst set having an SSB symbol and a corresponding physical broadcast channel (PBCH) symbol that is located a fixed number of symbols from the SSB symbol. The UE may obtain a location of the PBCH symbol based at least in part on the fixed number of symbols. Numerous other aspects are described.

29 Claims, 14 Drawing Sheets

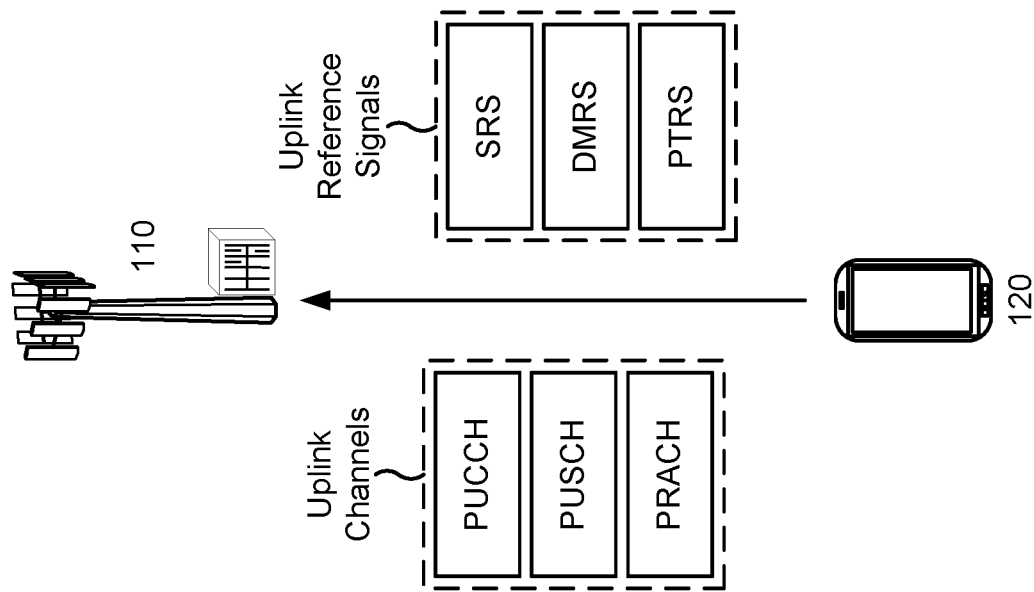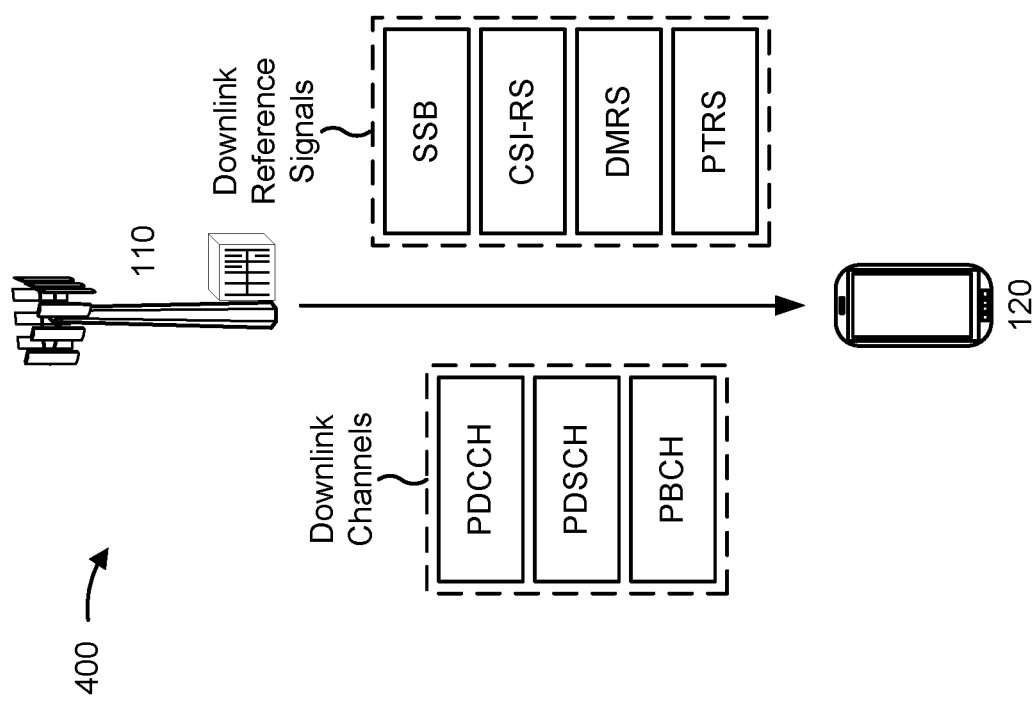
FIG. 4

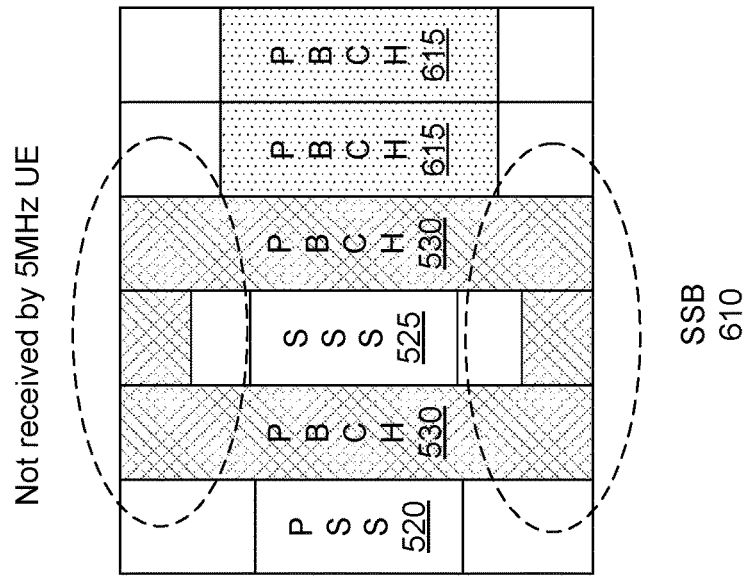
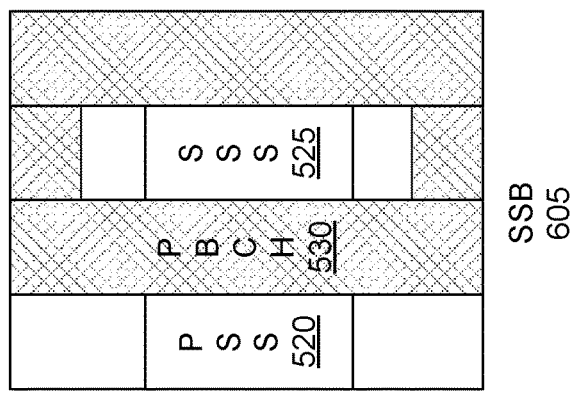
FIG. 6

PHYSICAL BROADCAST CHANNEL AND SYNCHRONIZATION SIGNAL BLOCK SIGNALING

FIELD OF THE DISCLOSURE

Aspects of the present disclosure generally relate to wireless communication and to techniques and apparatuses for physical broadcast channel and synchronization signal block signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a synchronization signal block (SSB) burst set that includes a plurality of SSBs, a majority of the SSBs in the SSB burst set having an SSB symbol and a corresponding physical broadcast channel (PBCH) symbol that is located a fixed number of symbols from the SSB symbol; and obtaining a location of the PBCH symbol based at least in part on the fixed number of symbols.

In some aspects, a method of wireless communication, performed by a network entity, may include obtaining an indication of a fixed number of symbols between a SSB symbol and a corresponding PBCH symbol for a PBCH that is associated with the SSB; and transmitting an SSB burst set that includes a plurality of SSBs, a majority of the SSBs in the SSB burst set having an SSB symbol and a corresponding PBCH symbol that is located the fixed number of symbols from the SSB symbol.

In some aspects, a UE for wireless communication may include memory and one or more processors coupled to the memory. For example, the one or more processors may be operatively, electronically, communicatively, or otherwise coupled to the memory. The memory may comprise instructions executable by the one or more processors to cause the UE to: receive a SSB burst set that includes a plurality of SSBs, a majority of the SSBs in the SSB burst set having an SSB symbol and a corresponding PBCH symbol that is located a fixed number of symbols from the SSB symbol; and obtain a location of the PBCH symbol based at least in part on the fixed number of symbols.

In some aspects, a network entity for wireless communication may include memory and one or more processors coupled to the memory. For example, the one or more processors may be operatively, electronically, communicatively, or otherwise coupled to the memory. The memory may comprise instructions executable by the one or more processors to cause the network entity to: obtain an indication of a fixed number of symbols between a SSB symbol and a corresponding PBCH symbol for a PBCH that is associated with the SSB; and transmit an SSB burst set that includes a plurality of SSBs, a majority of the SSBs in the SSB burst set having an SSB symbol and a corresponding PBCH symbol that is located the fixed number of symbols from the SSB symbol.

In some aspects, a non-transitory computer-readable medium may store one or more instructions for wireless communication. The one or more instructions, when executed by one or more processors of a UE, may cause the UE to: receive a SSB burst set that includes a plurality of SSBs, a majority of the SSBs in the SSB burst set having an SSB symbol and a corresponding PBCH symbol that is located a fixed number of symbols from the SSB symbol; and obtain a location of the PBCH symbol based at least in part on the fixed number of symbols.

In some aspects, a non-transitory computer-readable medium may store one or more instructions for wireless communication. The one or more instructions, when executed by one or more processors of a network entity, may cause the network entity to: obtain an indication of a fixed number of symbols between a SSB symbol and a corresponding PBCH symbol for a PBCH that is associated with the SSB; and transmit an SSB burst set that includes a plurality of SSBs, a majority of the SSBs in the SSB burst set having an SSB symbol and a corresponding PBCH symbol that is located the fixed number of symbols from the SSB symbol.

In some aspects, an apparatus for wireless communication may include means for receiving a SSB burst set that includes a plurality of SSBs, a majority of the SSBs in the SSB burst set having an SSB symbol and a corresponding PBCH symbol that is located a fixed number of symbols from the SSB symbol; and means for obtaining a location of the PBCH symbol based at least in part on the fixed number of symbols.

In some aspects, an apparatus for wireless communication may include means for obtaining an indication of a fixed number of symbols between a SSB symbol and a corresponding PBCH symbol for a PBCH that is associated with the SSB; and means for transmitting an SSB burst set that includes a plurality of SSBs, a majority of the SSBs in the SSB burst set having an SSB symbol and a corresponding PBCH symbol that is located the fixed number of symbols from the SSB symbol.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIG. 6 is a diagram illustrating an example of synchronization signal block (SSB) configuration, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
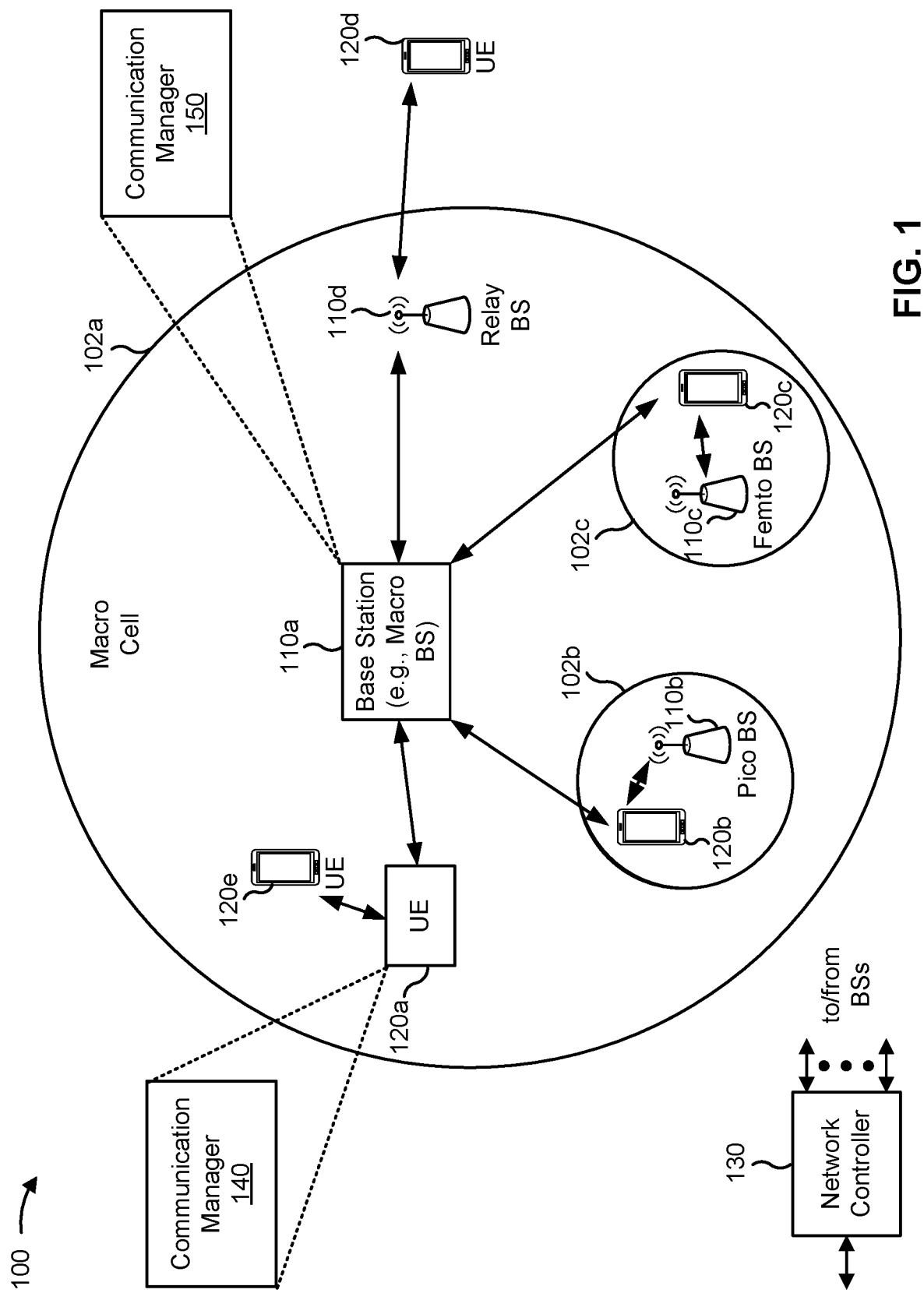
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) burst set that includes a plurality of SSBs, a majority of the SSBs in the SSB burst set having an SSB symbol and a corresponding physical broadcast channel (PBCH) symbol that is located a fixed number of symbols from the SSB symbol; and obtain a location of the PBCH symbol based at least in part on the fixed number of symbols. Additionally, or alternatively, the communication manager 140 may perform one or more other operations described herein.

In some aspects, a network entity (e.g., the base station 110) may include a communication manager 150. As described in more detail elsewhere herein, the communication manager 150 may obtain an indication of a fixed number of symbols between an SSB symbol and a corresponding PBCH symbol for a PBCH that is associated with the SSB; and transmit an SSB burst set that includes a plurality of SSBs, a majority of the SSBs in the SSB burst set having an SSB symbol and a corresponding PBCH symbol that is located the fixed number of symbols from the SSB symbol. Additionally, or alternatively, the communication manager 150 may perform one or more other operations described herein.

As indicated above, FIG. 1 is provided as an example. Other examples may differ from what is described with regard to FIG. 1.

Figure 2:
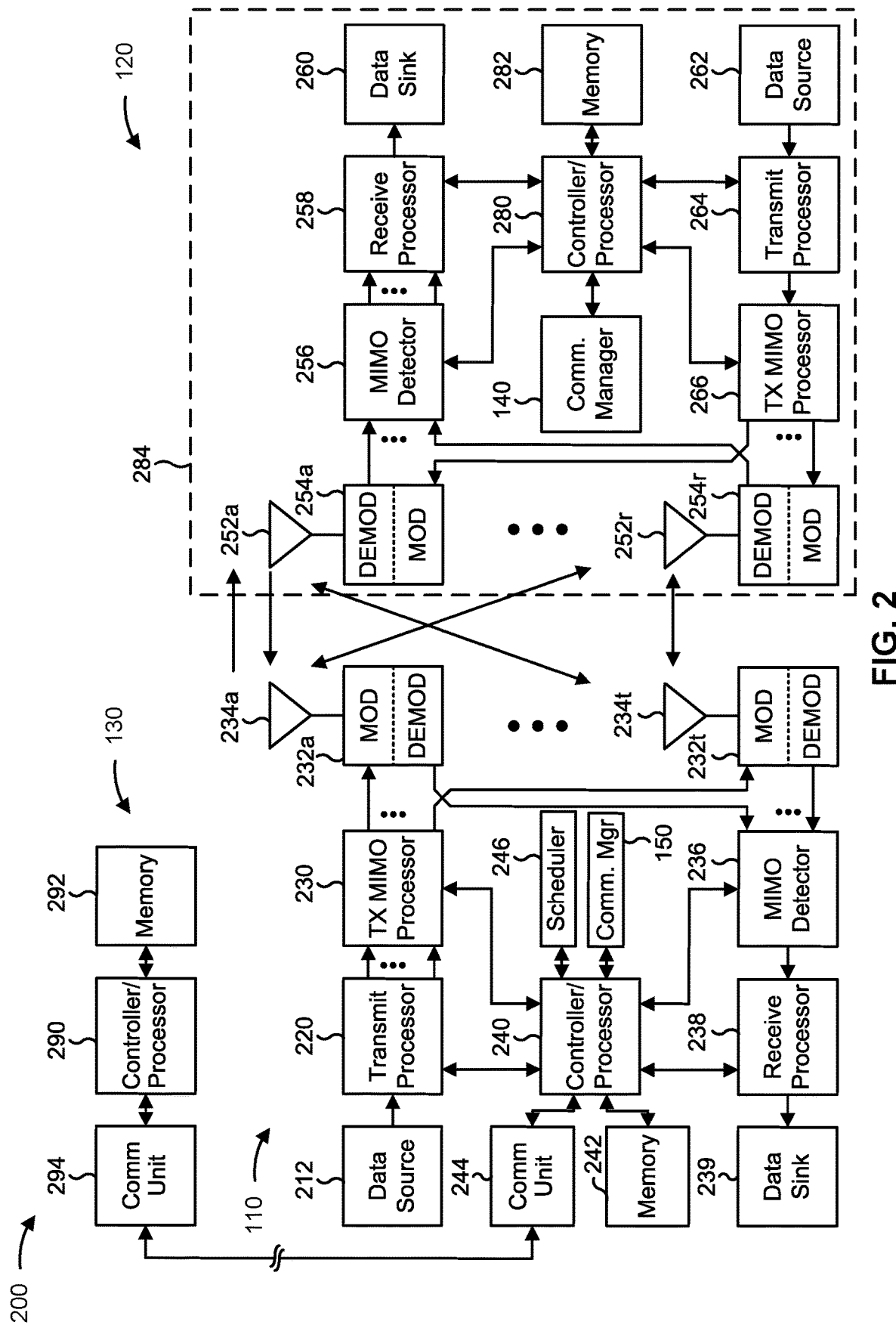
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the base station 110, the controller/processor 280 of the UE 120, and/or any other component(s) of FIG. 2 may perform one or more techniques associated with PBCH and SSB signaling, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE includes means for receiving an SSB burst set that includes a plurality of SSBs, a majority of the SSBs in the SSB burst set having an SSB symbol and a corresponding PBCH symbol that is located a fixed number of symbols from the SSB symbol; and/or means for obtaining a location of the PBCH symbol based at least in part on the fixed number of symbols. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for obtaining an indication of a fixed number of symbols between an SSB symbol and a corresponding PBCH symbol for a PBCH that is associated with the SSB; and/or means for transmitting an SSB burst set that includes a plurality of SSBs, a majority of the SSBs in the SSB burst set having an SSB symbol and a corresponding PBCH symbol that is located the fixed number of symbols from the SSB symbol. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
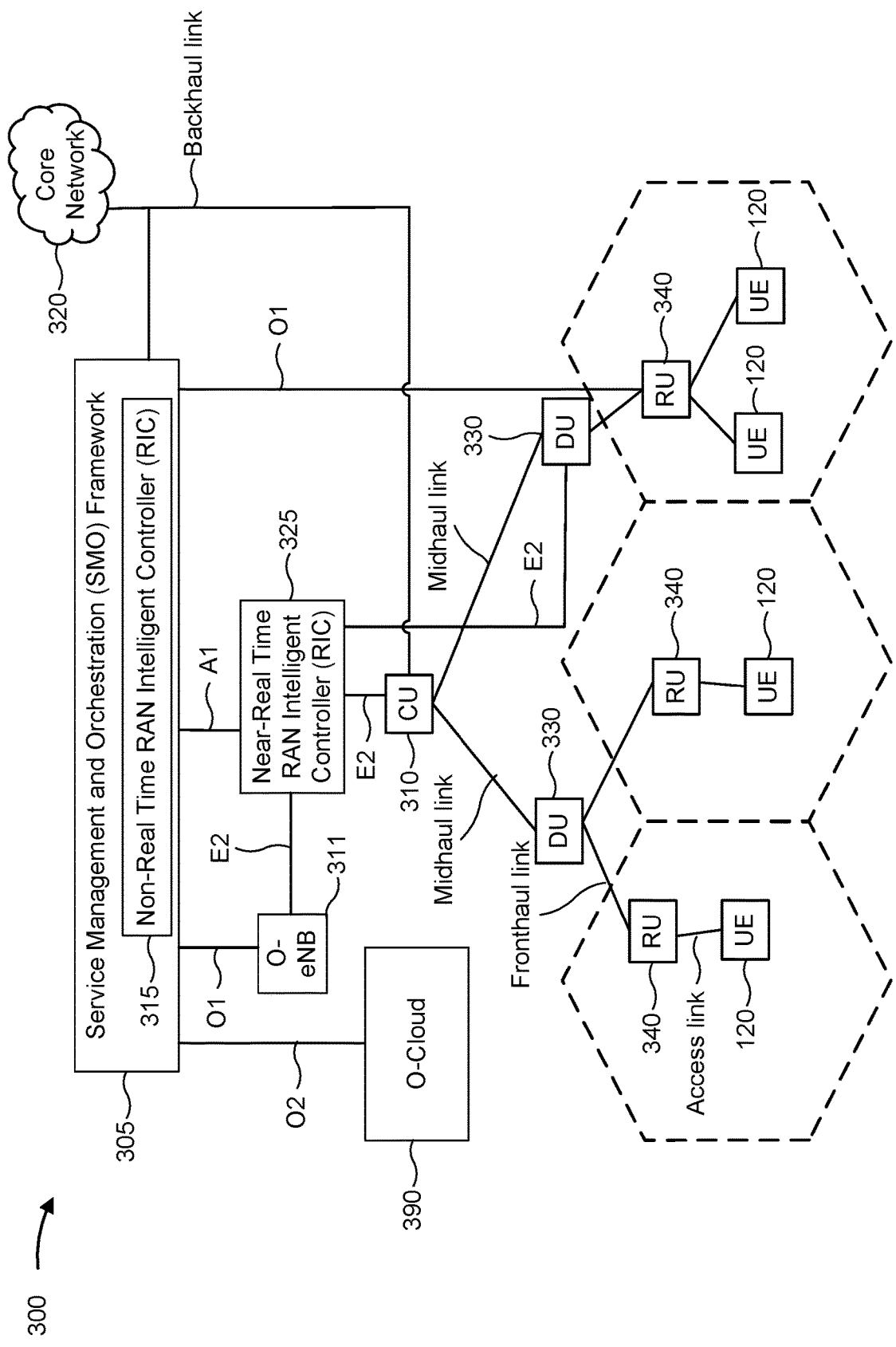
FIG. 3 is a diagram illustrating an example of a disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration.

The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML, models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a PBCH that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include an SSB, a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, a SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

In some cases, the SSB may include one or more additional PBCH symbols that are located within a number of symbols from the SSB. Additional details regarding these features are described herein.

As indicated above, FIG. 4 is provided as an example. Other examples may differ from what is described with regard to FIG. 4.

Figure 5:
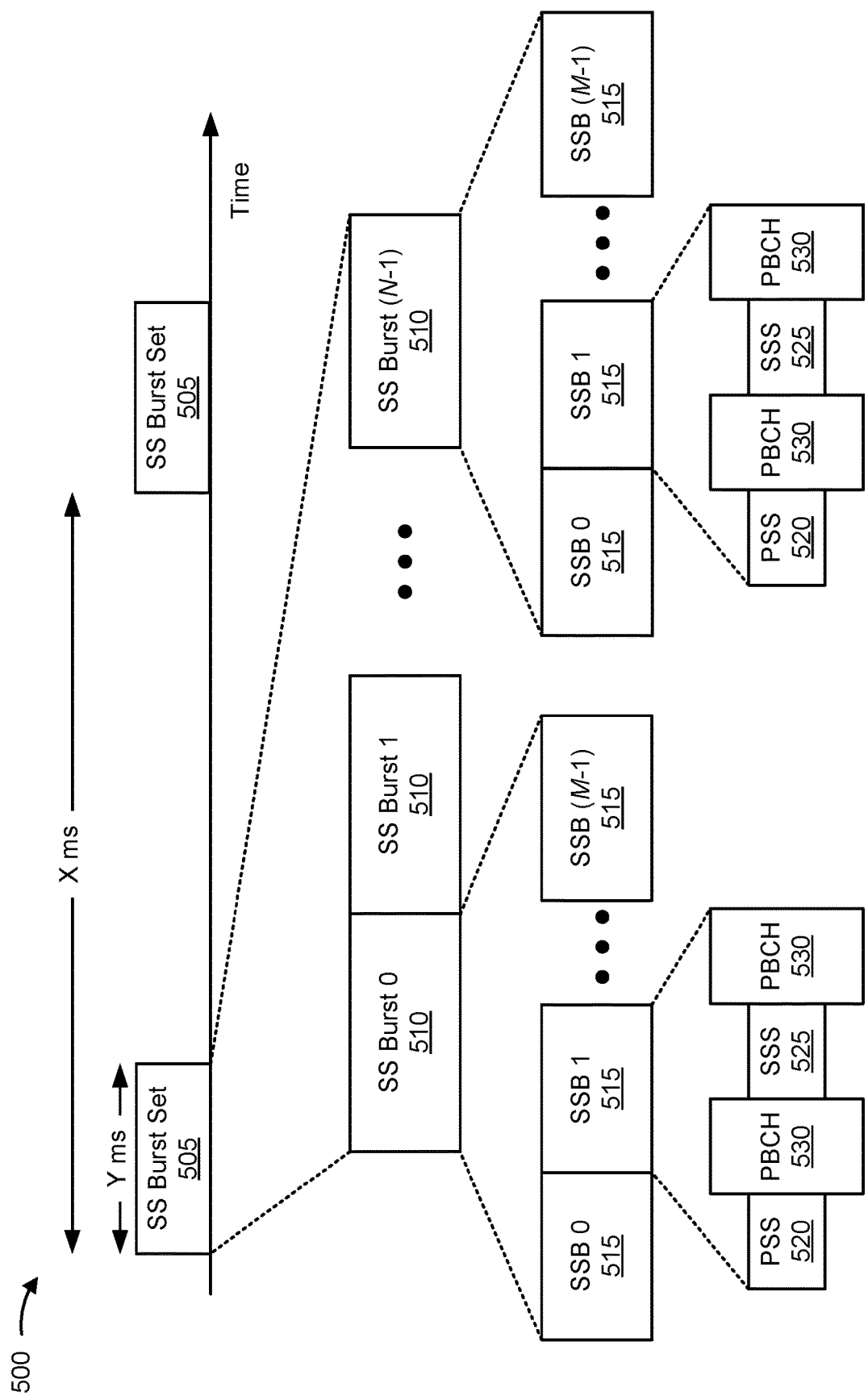
FIG. 5 is a diagram illustrating an example of a synchronization signal hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N–1, where N is a maximum number of repetitions of the SS burst 510 that may be transmitted by the base station. As further shown, each SS burst 510 may include one or more SSBs 515, shown as SSB 0 through SSB M–1, where M is a maximum number of SSBs 515 that can be carried by an SS burst 510. In some aspects, different SSBs 515 may be beamformed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., base station 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a PSS 520, a SSS 525, and/or a PBCH 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., base station 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a base station 110. The base station 110 and the UE 120 may use the one or more indicated SSBs 515 to select one or more beams to be used for communication between the base station 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

In some cases, an SSB (such as the SSB 515) may include one or more additional PBCH symbols that are located within a number of symbols from the SSB. Additional details regarding these features are described herein.

As indicated above, FIG. 5 is provided as an example. Other examples may differ from what is described with regard to FIG. 5.

FIG. 6 is a diagram illustrating an example 600 of SSB configuration, in accordance with the present disclosure.

In some cases, an SSB 605 may be spread over four symbols (e.g., four OFDM symbols). The SSB 605 may include the PSS 520, the SSS 525, and the PBCH 530 described herein. In some cases, the SSB 605 may be configured in accordance with Release 15 of the 3GPP specifications. The PSS 520 may be located in a first symbol of the SSB 605, the SSS 525 may be located in a third symbol of the SSB 605, and the PBCH 530 may be located in the second and fourth symbols of the SSB 605 and in a portion of the third symbol of the SSB 605.

In some cases, the UE 120 may be a reduced capability (RedCap) UE. A RedCap UE may have one or more reduced features when compared to a non-RedCap (e.g., premium or legacy) UE. For example, relative to the non-RedCap UE, the RedCap UE may support a lower maximum transmit power, may have a less advanced beamforming capability, may have a smaller maximum bandwidth, may have fewer antennas and/or antenna ports, may be restricted to half-duplex communication, and/or may have a lower power class. In some cases, the RedCap UE (e.g., enhanced RedCap UE (eRedCap UE)) may have an operating frequency of 5 MHz or approximately 5 MHz (e.g., between 4 MHz and 6 MHz).

In some cases, the SSB 605 may use 12 physical resource blocks (PRBs) for the PSS 520 and the SSS 525, and may use 20 PRBs for the PBCH 530. The RedCap UE may be able to receive the SSB 605 when 15 KHz subcarrier spacing (SCS) is used. However, the RedCap UE may not be able to properly receive the SSB 605 when 30 KHz SCS is used. For example, the bandwidth of the PBCH 530 using 30 KHz SCS may be larger than the 5 MHz.

In some cases, an SSB 610 may be spread over six symbols (e.g., six OFDM symbols). The SSB 610 may include the PSS 520, the SSS 525, and the PBCH 530. The PSS 520 may be located in a first symbol of the SSB 610, the SSS 525 may be located in a third symbol of the SSB 610, and the PBCH 530 may be located in the second and fourth symbols of the SSB 610 and in a portion of the third symbol of the SSB 610. However, the PBCH 530 may not be entirely received by the RedCap UE when 30 KHz SCS is used. In this case, the SSB 610 may include a second PBCH portion (shown as PBCH 615) that includes at least some of the PBCH information for the SSB 610.

As indicated above, FIG. 6 is provided as an example. Other examples may differ from what is described with regard to FIG. 6.

Figure 7:
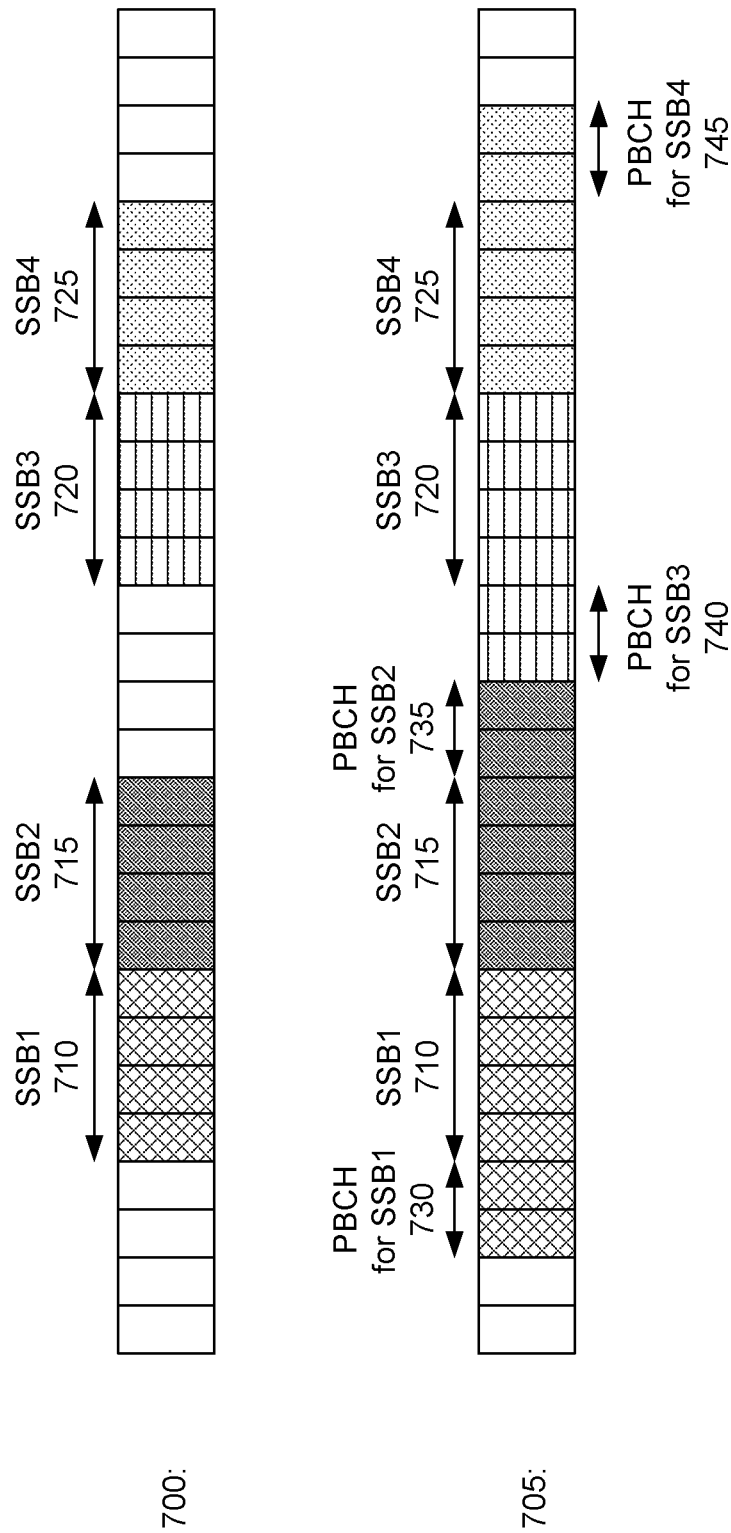
FIG. 7 is a diagram illustrating at least one example of an SSB symbol location, in accordance with the present disclosure.

FIG. 7 is a diagram illustrating examples of SSB symbol location within SSB burst sets 700 and 705, in accordance with the present disclosure.

In some cases, an SSB burst set 700 may include four SSBs, such as the SSB1 710, the SSB2 715, the SSB3 720 and the SSB4 725. Each of the SSBs in the SSB burst set may include a PSS (such as the PSS 520), an SSS (such as the SSS 525), and a PBCH (such as the PBCH 530). Assuming 30 KHz SCS for the SSB burst set 700, the first symbol of the SSB1 710 may be symbol 4 of a symbol index, the first symbol of the SSB2 715 may be symbol 8 of the symbol index, the first symbol of the SSB3 720 may be symbol 16 of the symbol index, and the first symbol of the SSB4 725 may be symbol 20 of the symbol index.

As described herein, a RedCap UE (e.g., having an operating frequency of 5 MHz or approximately 5 MHz) may not be able to receive the entirety of the PBCH information included in the SSB1 710, the SSB2 715, the SSB3 720, and/or the SSB4 725. In some cases, the SSB burst set 705 may include one or more additional PBCH symbols associated with the SSBs in order to enable the RedCap UE to properly receive the PBCH information for the SSB. For example, the SSB burst set 705 may include one or more PBCH symbols 730 for the SSB1 710, one or more PBCH symbols 735 for the SSB2 715, one or more PBCH symbols 740 for the SSB3 715, and one or more PBCH symbols 745 for the SSB4 720. The PBCH symbols 730, 735, 740, and/or 745 may include some or all of the information included in the PBCH 615 described above.

In some cases, the one or more additional PBCH symbols may be located adjacent to the corresponding SSB. For example, the PBCH symbols 730 may be located adjacent and prior to the SSB1 710, the PBCH symbols 735 may be located adjacent and following the SSB2 715, the PBCH symbols 740 may be located adjacent and prior to the SSB3 720, and the PBCH symbols 745 may be located adjacent and following the SSB4 725. When the UE performs a channel access procedure, after detecting the PSS and SSS, the UE may not know the location of the additional PBCH symbols. Thus, the UE may need to perform two hypotheses to determine the PBCH information. A hypothesis may correspond to a detection attempt for detecting the location of the one of more additional PBCH symbols. For example, the UE may need to perform a first hypothesis to detect whether the PBCH symbols are located prior to the SSB and a second hypothesis to detect whether the PBCH symbols are located after the SSB. This may increase UE complexity and may negatively impact network performance.

Techniques and apparatuses are described herein for PBCH and SSB signaling. In some aspects, the UE may receive an SSB burst set that includes a plurality of SSBs, a majority of the SSBs in the SSB burst set having an SSB symbol and a corresponding PBCH symbol that is located a fixed number of symbols from the SSB symbol. The UE may obtain a location of the PBCH symbol (or multiple PBCH symbols) based at least in part on the fixed number of symbols. For example, the UE may obtain the location of the PBCH symbol using a single hypothesis.

As described above, PBCH information associated with an SSB may be located in one or more symbols prior to the SSB or in one or more symbols following the SSB. The UE may need to perform multiple hypotheses to locate the PBCH information. This may increase UE complexity and may negatively impact network performance. Using the techniques and apparatuses described herein, the UE may receive an SSB having an SSB symbol and a PBCH symbol that is located a fixed number of symbols from the SSB symbol. Thus, the UE may be able to determine the location of the PBCH information using a single hypothesis for at least some of the SSBs within an SSB burst set. This may decrease the UE complexity and may improve network performance.

As indicated above, FIG. 7 is provided as an example. Other examples may differ from what is described with regard to FIG. 7.

Figure 8:
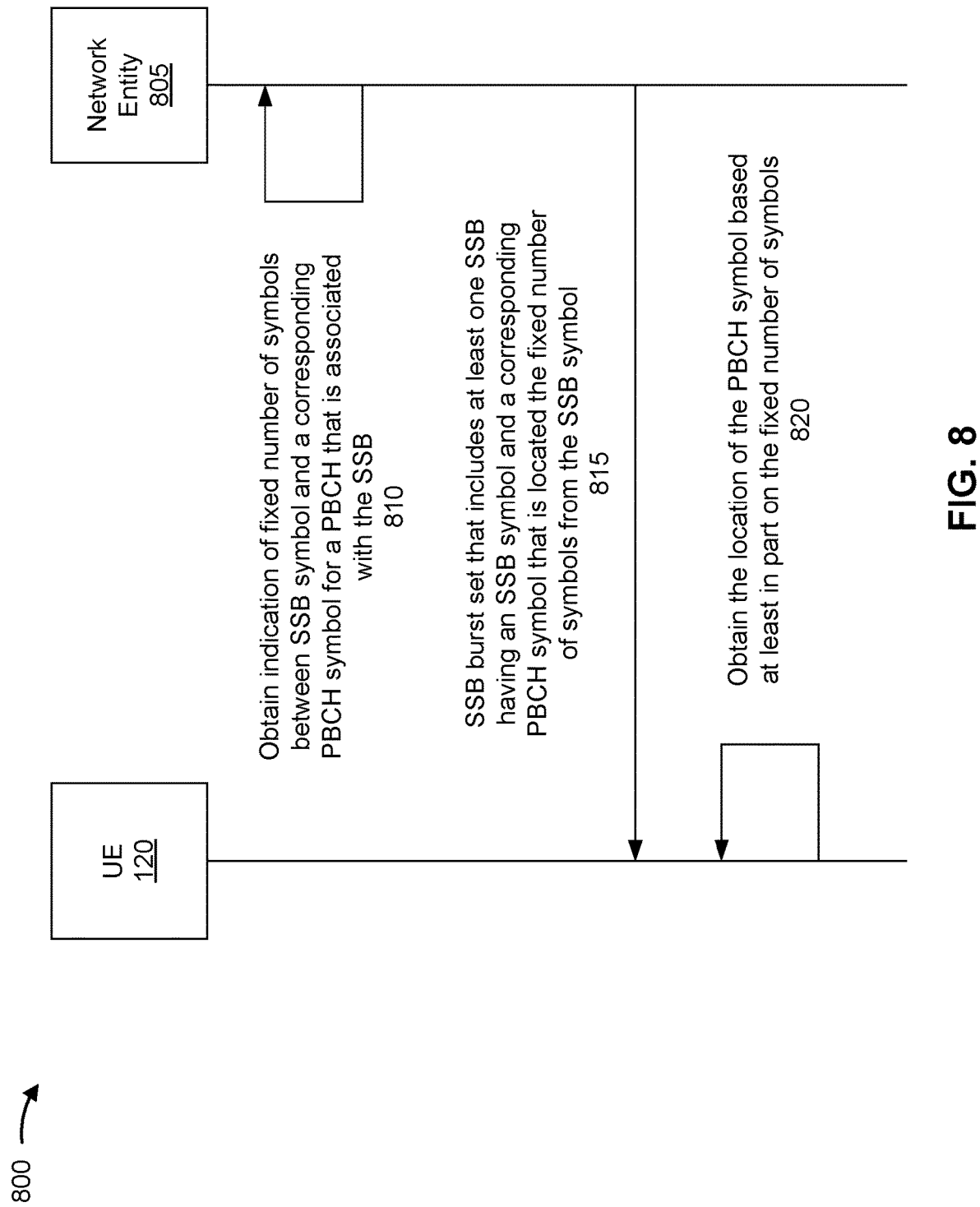
FIG. 8 is a diagram illustrating an example associated with physical broadcast channel (PBCH) and SSB signaling, in accordance with the present disclosure.

FIG. 8 is a diagram illustrating an example 800 of PBCH and SSB signaling, in accordance with the present disclosure. The UE 120 may communicate with a network entity 805. The network entity 805 may include some or all of the features of the base station 110, the CU 310, the DU 330 and/or the RU 340. In some aspects, the UE 120 may be a RedCap UE.

As shown in connection with reference number 810, the network entity 805 may obtain an indication of a fixed number of symbols between an SSB symbol and a corresponding PBCH symbol for a PBCH that is associated with the SSB. For example, the network entity 805 may obtain an indication of a fixed number of symbols between a symbol of the SSB1 710 and a symbol of the PBCH symbols 730 for the SSB1 710. As described herein, the PBCH symbols 730 may include additional PBCH information that cannot be received by the UE 120 (e.g., the RedCap UE) within the SSB when 30 KHz SCS is being used.

In some aspects, the fixed number of symbols between the SSB and the corresponding PBCH symbol may be based at least in part on a particular symbol of the SSB and a corresponding symbol of the PBCH. For example, the fixed number of symbols may be based at least in part on a first symbol of the SSB and a first symbol of the corresponding PBCH. In this example, the distance between the first symbol of the SSB and the first symbol of the corresponding PBCH may be the fixed number of symbols (e.g., 28 symbols). In another example, the fixed number of symbols may be based at least in part on a last symbol of the SSB and a last symbol of the PBCH. In another example, the fixed number of symbols may be based at least in part on a first symbol of the SSB and a last symbol of the PBCH, or between a last symbol of the SSB and a first symbol of the PBCH. Other examples may be considered.

In some aspects, the UE 120 may be configured to determine the location of one or more other PBCH symbols based at least in part on the fixed number of symbols. For example, the fixed number of symbols may indicate the location of the first PBCH symbol of the additional PBCH symbols, and the UE 120 may be configured with information that indicates the total number of additional PBCH symbols. In the example that the number of additional PBCH symbols is two, the UE 120 may detect the first PBCH symbol (corresponding to the fixed number of symbols from the first SSB symbol) and the symbol immediately following first PBCH symbol.

As shown in connection with reference number 815, the network entity 805 may transmit, and the UE 120 may receive, an SSB burst set that includes at least one SSB having an SSB symbol and a corresponding PBCH symbol that is located the fixed number of symbols from the SSB symbol. As described herein, the SSB burst set may include a number of SSBs, such as SSB1, SSB2, SSB3, and SSB4.

In a first example, every SSB in the SSB burst set may have an SSB symbol and a corresponding PBCH symbol that is located the fixed number of symbols from the SSB symbol. For example, the PBCH associated with SSB1 may have a first symbol that is located the fixed number of symbols from the first symbol of the SSB1, the PBCH associated with SSB2 may have a first symbol that is located the fixed number of symbols from the first symbol of the SSB2, the PBCH associated with SSB3 may have a first symbol that is located the fixed number of symbols from the first symbol of the SSB3, and the PBCH associated with SSB4 may have a first symbol that is located the fixed number of symbols from the first symbol of the SSB4. Additional details regarding these features are described in connection with FIG. 9.

In some aspects, the fixed number of symbols between the SSB symbol and the corresponding PBCH symbol may be based at least in part on a carrier frequency. For example, the fixed number of symbols between the SSB symbol (e.g., the first symbol of the SSB) and the corresponding PBCH symbol (e.g., the first symbol of the PBCH associated with the SSB) may be a first number of symbols if the carrier frequency is less than, or less than or equal to, a carrier frequency threshold, or may be a second number of symbols if the carrier frequency is greater than, or greater than or equal to, the carrier frequency threshold. In one example, if the carrier frequency is less than, or less than or equal to, 3 GHz, the fixed number of symbols between the SSB symbol and the corresponding PBCH symbol may be 28 symbols. Alternatively, if the carrier frequency is greater than, or greater than or equal to, 3 GHz, the fixed number of symbols between the SSB symbol and the corresponding PBCH symbol may be 56 symbols. Note that the values for the carrier frequency threshold and the fixed number of symbols are provided for example only. Other values for the carrier frequency threshold and/or the fixed number of symbols may be considered.

In a second example, some of the SSBs in the SSB burst set may have an SSB symbol and a corresponding PBCH symbol that is located the fixed number of symbols from the SSB symbol. For example, a majority (e.g., more than half) of the SSBs in the SSB burst set may have an SSB symbol and a corresponding PBCH symbol that is located the fixed number of symbols from the SSB symbol. In an example that the SSB burst set includes four SSBs, three of the SSBs may have an SSB symbol and a corresponding PBCH symbol that is located the fixed number of symbols from the SSB symbol. For example, the PBCH associated with SSB1 may have a first symbol that is located the fixed number of symbols from the first symbol of the SSB1, the PBCH associated with SSB3 may have a first symbol that is located the fixed number of symbols from the first symbol of the SSB3, and the PBCH associated with SSB4 may have a first symbol that is located the fixed number of symbols from the first symbol of the SSB4. In this example, the PBCH associated with SSB3 may have a first symbol that is located another number of symbols from the first symbol of the SSB. In some aspects (e.g., for carrier frequency less than 3 MHz), the number of symbols between the first PBCH symbol and the first SSB symbol for the SSB1, SSB3, and SSB4 may be five symbols, while the number of symbols between the first PBCH symbol and the first SSB symbol for the SSB2 may be three symbols. Additional details regarding these features are described in connection with FIG. 10.

In some aspects, the first example may be preferable since every SSB in the SSB burst set has the corresponding PBCH symbol that is located the fixed number of symbols from the SSB symbol. However, the first example may require a greater number of symbols (and a larger bandwidth) since the corresponding PBCH symbols are located a further distance from the SSB symbols. Alternatively, the second example may only allow for some of the PBCH symbols to be located at the fixed distance from the SSB symbols. For example, only three of the PBCH symbols (e.g., for carrier frequency less than 3 MHz), or only six of the PBCH symbols (e.g., for carrier frequency greater than 6 MHz), may be located at the fixed distance from the SSB symbols. However, the corresponding PBCH symbols for the subset of the SSBs may be located closer to the SSBs (thereby consuming a smaller bandwidth).

As shown in connection with reference number 820, the UE 120 may obtain a location of the PBCH symbol based at least in part on the fixed number of symbols. For example, the UE 120 may obtain the location of the PBCH symbol using a single hypothesis for at least some of the SSBs in the SSB burst set.

In the first example described above, the UE 120 may only need to perform a single hypothesis to determine the location of the PBCH symbol for every SSB. In this case, when the UE 120 detects the PSS and/or the SSS associated with the SSB1, the UE 120 may locate the PBCH associated with the SSB1 based at least in part on the fixed number of symbols. For example, the UE 120 may detect that the first symbol of the SSB1 is located at a symbol location 4 of a symbol index. In the example that the carrier frequency is less than, or less than or equal to, 3 MHz, the UE 120 may determine that the first symbol of the PBCH associated with the SSB1 is located at symbol location 32 of the symbol index. The PBCH associated with SSB2, SSB3, and SSB4 may be obtained in a similar manner. In some aspects, the network entity 805 may transmit the SSBs within the SSB burst set using a two-beam sweep. For example, a first beam sweep may be used for the SSB information (e.g., the PSS 520, SSS 525, and PBCH 530) and may be intended for all UEs, while a second beam sweep may be used for the corresponding PBCH information (e.g., the additional PBCH symbols 615) and may be intended only for the RedCap UEs.

In the second example described above, the UE 120 may perform a single hypothesis for the SSBs having the corresponding PBCH symbol that is located the fixed number of symbols from the SSB symbol. However, the UE 120 may need to perform two (or more) hypotheses for the SSB having the corresponding PBCH that is not located the fixed number of symbols from the SSB symbol. For example, each of the SSB1, SSB3 and SSB4 may have an SSB symbol and a corresponding PBCH symbol that is located the fixed number of symbols from the SSB symbol. However, the SSB2 may have an SSB symbol and a corresponding PBCH symbol that is located another fixed number of symbols from the SSB symbol. In this example, the UE 120 may determine the location of the corresponding PBCH symbol for the SSB1, SSB3 and SSB4 using a single hypothesis. However, the UE 120 may need to perform multiple hypothesis to determine the location of the corresponding PBCH symbol for the SSB2.

In some aspects, the network entity 805 may transmit, and the UE 120 may receive, information to assist the UE 120 to determine a location of a corresponding PBCH symbol for the SSB. For example, the network entity 805 may transmit, and the UE 120 may receive, information that indicates a location of the corresponding PBCH symbol for the SSB2.

In some aspects, the network entity 805 may transmit only a subset of the SSBs that are capable of being transmitted in the SSB burst set. For example, the network entity 805 may transmit three SSBs in the SSB burst set, rather than the four SSBs that are capable of being transmitted in the SSB burst set. The network entity 805 may determine to transmit SSB1, SSB3 and SSB4, and/or may determine not to transmit SSB2. In this case, each of the SSBs in the SSB burst set may include an SSB symbol and a corresponding PBCH symbol that is located the fixed number of symbols from the SSB symbol.

In some aspects, the network entity 805 may transmit, and the UE 120 may receive, signaling information indicating that one or more neighbor cells are only transmitting SSBs having corresponding PBCH symbols that are located the fixed number of symbols from the SSB symbols. For example, the network entity 805 may transmit, and the UE 120 may receive, signaling information indicating that one or more neighbor cells are only transmitting three SSBs within the SSB burst set, and that each of the SSBs have a corresponding PBCH symbol that is located the fixed number of symbols from the SSB symbol. In some aspects, the signaling information may include, or may be included in, system information, DCI, a MAC control element (MAC-CE), or RRC signaling. In some aspects, the signaling information may indicate the SSB indices that need to be detected and measured. Based at least in part on the signaling information, the UE 120 can determine whether it needs to perform a single hypothesis or multiple hypothesis to locate the PBCH symbols. For example, if the signaling information indicates that the neighbor cells are only transmitting SSB1, SSB3 and SSB4, the UE 120 may determine that it only needs to perform a single hypothesis to locate the corresponding PBCH symbols.

In some aspects, the additional PBCH symbols may be intended only for RedCap UEs. Thus, the network entity 805 may be configured to transmit the signaling information only to the RedCap UEs (and not to non-RedCap UEs). In some aspects, the signaling information may include cell-specific signals that indicate a common search space for different system information blocks (SIBs). The cell specific signals may be broadcast PDCCH signals or broadcast PDSCH signals that use control resource set zero (CORESET 0). In some aspects, if the additional PBCH symbols require less than 5 MHz, the network entity 805 network may include (e.g., overlap) the RedCap UE specific PDCCH and PDSCH information in the additional PBCH symbols and may instruct the RedCap UE to rate match around the tones that carry PBCH information.

In some aspects, the network entity 805 may transmit the SSBs to a first set of UEs (e.g., non-RedCap UEs) using a first bandwidth and a first set of symbols. The network entity 805 may transmit the SSBs to a second set of UEs (e.g., RedCap UEs) using a second bandwidth, and using the first set of symbols and a second set of symbols. For example, the network entity 805 may transmit the SSBs to the RedCap UEs using a first set of symbols for the SSBs and a second set of symbols for the additional PBCH information. In some aspects, the second bandwidth may be a subset of the first bandwidth.

As described above, PBCH information associated with an SSB may be located in one or more symbols prior to the SSB or in one or more symbols following the SSB. The UE may need to perform multiple hypotheses to locate the PBCH information. This may increase UE complexity and may negatively impact network performance. Using the techniques and apparatuses described herein, the UE may receive an SSB having an SSB symbol and a PBCH symbol that is located a fixed number of symbols from the SSB symbol. Thus, the UE may be able to determine the location of the PBCH information using a single hypothesis for at least some of the SSBs within an SSB burst set. This may decrease the UE complexity and may improve network performance.

As indicated above, FIG. 8 is provided as an example. Other examples may differ from what is described with regard to FIG. 8.

Figure 9:
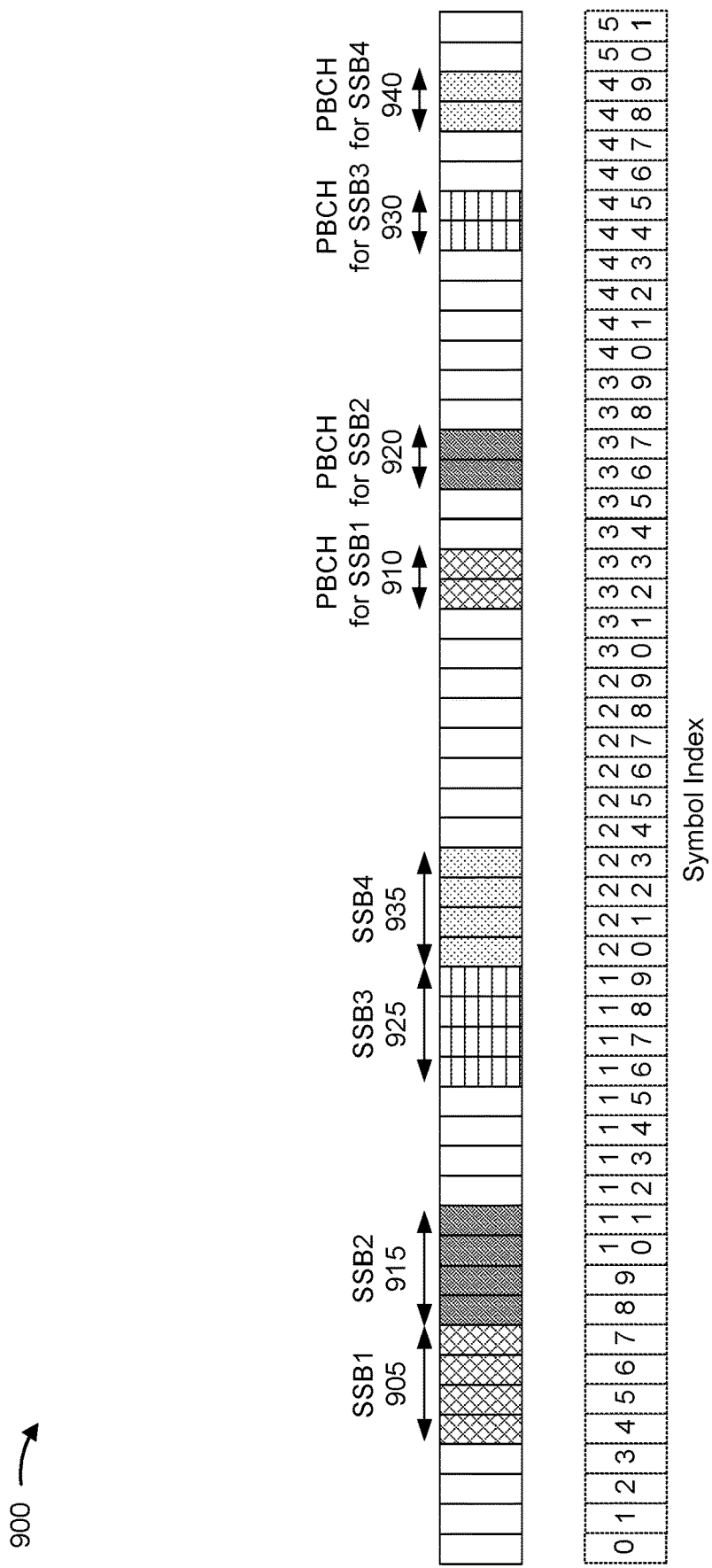
FIG. 9 is a diagram illustrating an example associated with PBCH and SSB symbol location, in accordance with the present disclosure.

FIG. 9 is a diagram illustrating an example 900 of PBCH and SSB symbol location, in accordance with the present disclosure. In some aspects (e.g., as in the first example described in connection with FIG. 8), every SSB in the SSB burst set may have an SSB symbol and a corresponding PBCH symbol that is located the fixed number of symbols from the SSB symbol. As shown in the example 900, an SSB burst set may include SSB1 905 and a corresponding PBCH 910 for the SSB1 905, SSB2 915 and a corresponding PBCH 920 for the SSB2 915, SSB3 925 and a corresponding PBCH 930 for the SSB3 925, and SSB4 935 and a corresponding PBCH 940 for the SSB4 935. The first symbol of the PBCH 910 may be located a fixed number of symbols from the first symbol of the SSB1 905. The first symbol of the PBCH 920 may be located the fixed number of symbols from the first symbol of the SSB2 915. The first symbol of the PBCH 930 may be located the fixed number of symbols from the first symbol of the SSB3 925. The first symbol of the PBCH 940 may be located the fixed number of symbols from the first symbol of the SSB4 935. In one example, the fixed number of symbols may be 28 symbols if the carrier frequency is less than, or less than or equal to, a carrier frequency threshold (e.g., 3 GHz). In another example, the fixed number of symbols may be 56 symbols if the carrier frequency is greater than, or greater than or equal to, the carrier frequency threshold.

As indicated above, FIG. 9 is provided as an example. Other examples may differ from what is described with regard to FIG. 9.

Figure 10:
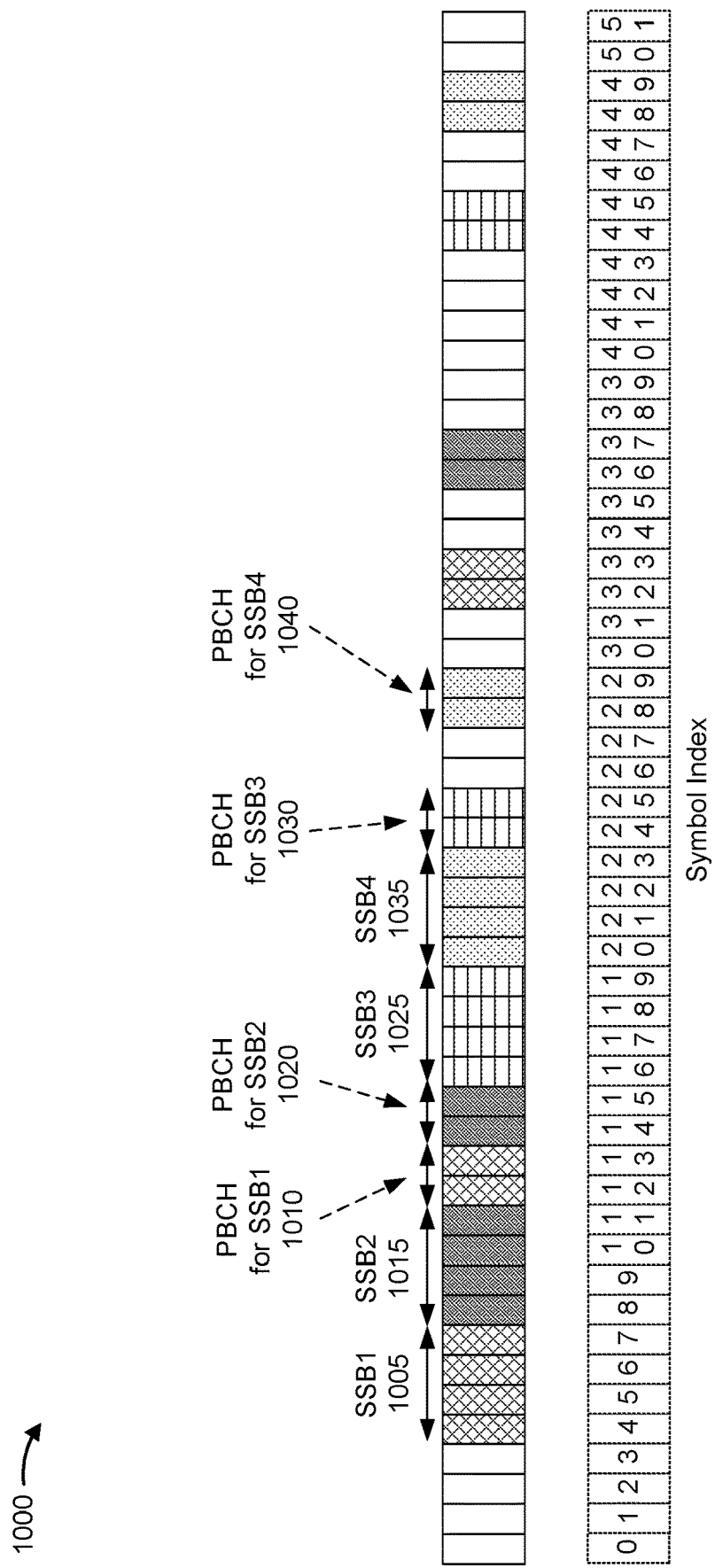
FIG. 10 is a diagram illustrating an example associated with PBCH and SSB symbol location, in accordance with the present disclosure.

FIG. 10 is a diagram illustrating an example 1000 of PBCH and SSB symbol location, in accordance with the present disclosure. In some aspects (e.g., as in the second example described in connection with FIG. 8), some of the SSBs in the SSB burst set may have an SSB symbol and a corresponding PBCH symbol that is located the fixed number of symbols from the SSB symbol. As shown in the example 1000, an SSB burst set may include SSB1 1005 and a corresponding PBCH 1010 for the SSB1 1005, SSB2 1015 and a corresponding PBCH 1020 for the SSB2 1015, SSB3 1025 and a corresponding PBCH 1030 for the SSB3 1025, and SSB4 1035 and a corresponding PBCH 1040 for the SSB4 1035. The first symbol of the PBCH 1010 may be located a fixed number of symbols from the first symbol of the SSB1 1005. The first symbol of the PBCH 1030 may be located the fixed number of symbols from the first symbol of the SSB3 1025. The first symbol of the PBCH 1040 may be located the fixed number of symbols from the first symbol of the SSB4 1035. However, the first symbol of the PBCH 1020 may not be located the fixed number of symbols from the first symbol of the SSB2 1015. Alternatively, the first symbol of the PBCH 1020 may be located another fixed number of symbols from the first symbol of the SSB2 1015. For example, the fixed number of symbols may be five symbols, but the other fixed number of symbols may be three symbols.

As indicated above, FIG. 10 is provided as an example. Other examples may differ from what is described with regard to FIG. 10.

Figure 11:
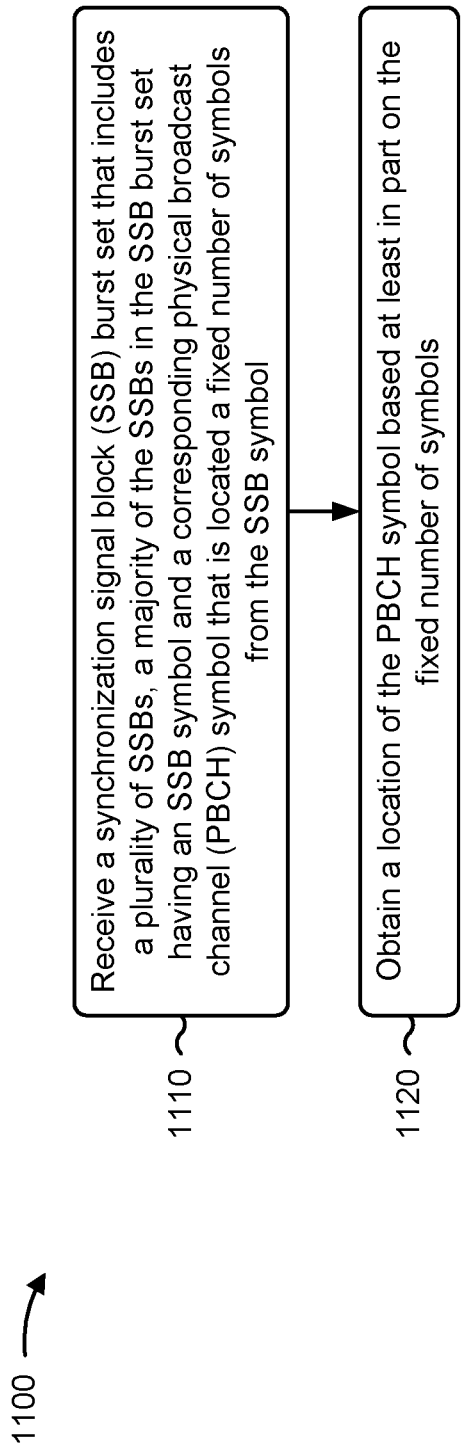
FIG. 11 is a diagram illustrating an example process associated with PBCH and SSB signaling, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with PBCH and SSB signaling.

As shown in FIG. 11, in some aspects, process 1100 may include receiving a SSB burst set that includes a plurality of SSBs, a majority of the SSBs in the SSB burst set having an SSB symbol and a corresponding PBCH symbol that is located a fixed number of symbols from the SSB symbol (block 1110). For example, the UE (e.g., using communication manager 140 and/or reception component 1302, depicted in FIG. 13) may receive a SSB burst set that includes a plurality of SSBs, a majority of the SSBs in the SSB burst set having an SSB symbol and a corresponding PBCH symbol that is located a fixed number of symbols from the SSB symbol, as described above.

As further shown in FIG. 11, in some aspects, process 1100 may include obtaining a location of the PBCH symbol based at least in part on the fixed number of symbols (block 1120). For example, the UE (e.g., using communication manager 140 and/or obtaining component 1308, depicted in FIG. 13) may obtain a location of the PBCH symbol based at least in part on the fixed number of symbols, as described above.

Process 1100 may include additional aspects, such as any single aspect or any combination of aspects described below and/or in connection with one or more other processes described elsewhere herein.

In a first aspect, the SSB burst set includes a plurality of SSBs, and wherein each SSB of the plurality of SSBs has an SSB symbol and a corresponding PBCH symbol that is located the fixed number of symbols from the SSB symbol.

In a second aspect, alone or in combination with the first aspect, the SSB burst set includes a plurality of SSBs, and wherein a majority of the SSBs, of the plurality of SSBs, have an SSB symbol and a corresponding PBCH symbol that is located the fixed number of symbols from the SSB symbol.

In a third aspect, alone or in combination with one or more of the first and second aspects, the SSB burst set includes four SSBs, and wherein three of the four SSBs have an SSB symbol and a corresponding PBCH symbol that is located the fixed number of symbols from the SSB symbol.

In a fourth aspect, alone or in combination with one or more of the first through third aspects, the three SSBs are a first SSB, a third SSB, and a fourth SSB of the SSB burst set.

In a fifth aspect, alone or in combination with one or more of the first through fourth aspects, one or more other symbols are located between the SSB symbol and the corresponding PBCH symbol.

In a sixth aspect, alone or in combination with one or more of the first through fifth aspects, the corresponding PBCH symbol that is located the fixed number of symbols from the SSB symbol is located the fixed number of symbols before the SSB symbol or the fixed number of symbols after the SSB symbol.

In a seventh aspect, alone or in combination with one or more of the first through sixth aspects, the fixed number of symbols is based at least in part on a distance between a first SSB symbol of an SSB and a first PBCH symbol of a corresponding PBCH.

In an eighth aspect, alone or in combination with one or more of the first through seventh aspects, the fixed number of symbols is a first fixed number of symbols based at least in part on an operating frequency being less than or equal to an operating frequency threshold, or a second fixed number of symbols based at least in part on the operating frequency being greater than the operating frequency threshold.

In a ninth aspect, alone or in combination with one or more of the first through eighth aspects, the first fixed number of symbols is 28 symbols, the second fixed number of symbols is 56 symbols, and the operating frequency threshold is 3 GHz.

In a tenth aspect, alone or in combination with one or more of the first through ninth aspects, process 1100 includes transmitting an indication that one or more neighboring cells are transmitting a subset of SSBs that is less than a total fixed number of possible SSBs in the SSB burst set.

In an eleventh aspect, alone or in combination with one or more of the first through tenth aspects, each SSB of the subset of SSBs has an SSB symbol and a corresponding PBCH symbol that is located the fixed number of symbols from the SSB symbol.

In a twelfth aspect, alone or in combination with one or more of the first through eleventh aspects, the transmitting the indication comprises transmitting system information, uplink control information, a medium access control message, or a radio resource control message that includes the indication.

In a thirteenth aspect, alone or in combination with one or more of the first through twelfth aspects, the indication indicates an SSB index associated with each SSB in the subset of SSBs.

In a fourteenth aspect, alone or in combination with one or more of the first through thirteenth aspects, the corresponding PBCH symbol overlaps with a symbol that is used for communicating a cell specific signal.

In a fifteenth aspect, alone or in combination with one or more of the first through fourteenth aspects, process 1100 includes receiving physical downlink control channel information or physical downlink shared channel information in the corresponding PBCH symbol, and receiving an instruction to rate match around one or more tones that include PBCH information.

In a sixteenth aspect, alone or in combination with one or more of the first through fifteenth aspects, the obtaining the location of the PBCH symbol comprises obtaining the location of the PBCH symbol using a single hypothesis.

In a seventeenth aspect, alone or in combination with one or more of the first through sixteenth aspects, the UE is a reduced capability UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
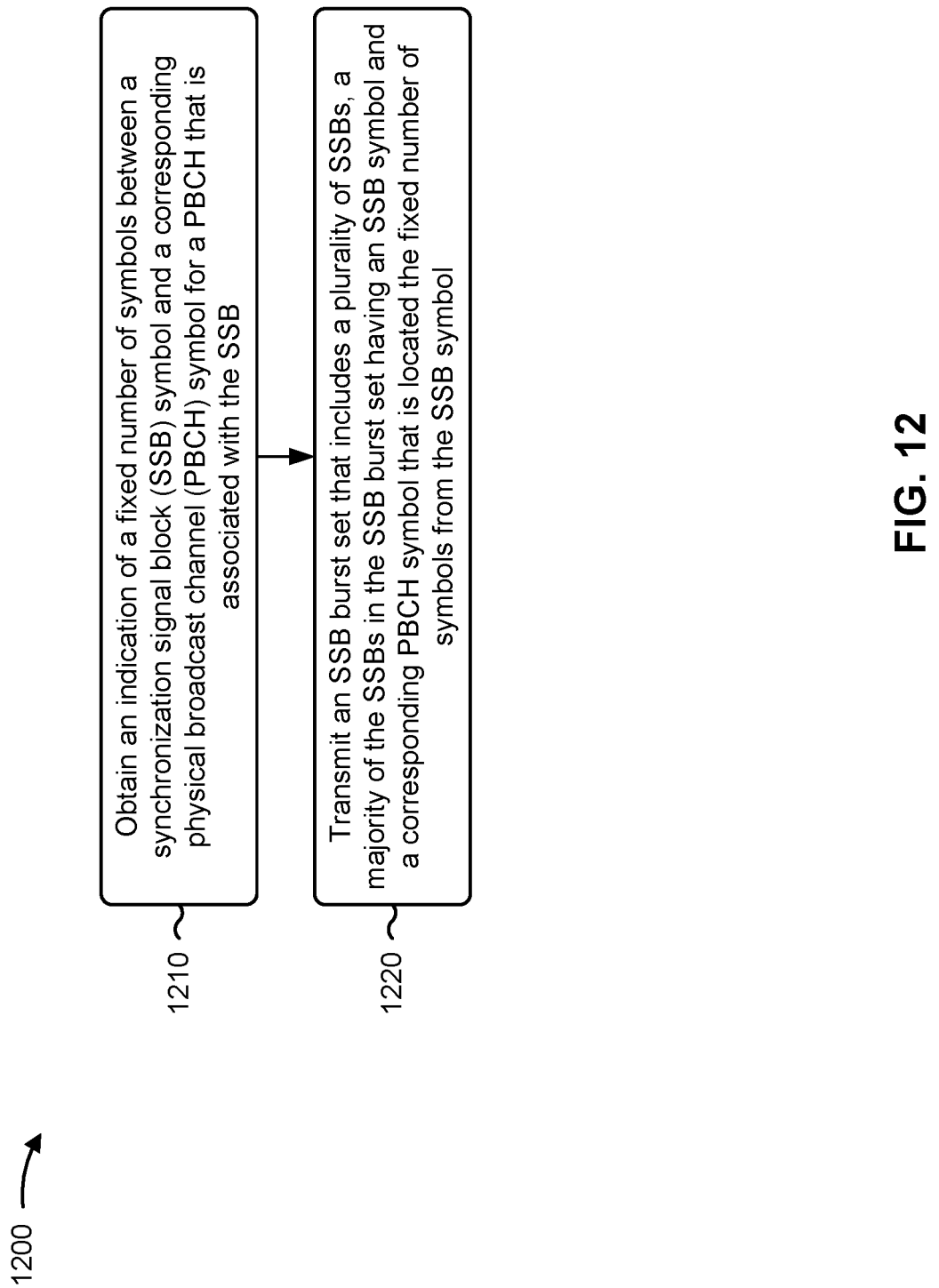
FIG. 12 is a diagram illustrating an example process associated with PBCH and SSB signaling, in accordance with the present disclosure.

FIG. 12 is a diagram illustrating an example process 1200 performed, for example, by a network entity, in accordance with the present disclosure. Example process 1200 is an example where the network entity (e.g., network entity 805) performs operations associated with PBCH and SSB signaling.

As shown in FIG. 12, in some aspects, process 1200 may include obtaining an indication of a fixed number of symbols between a SSB symbol and a corresponding PBCH symbol for a PBCH that is associated with the SSB (block 1210). For example, the network entity (e.g., using communication manager 150 and/or obtaining component 1408, depicted in FIG. 14) may obtain an indication of a fixed number of symbols between a SSB symbol and a corresponding PBCH symbol for a PBCH that is associated with the SSB, as described above.

As further shown in FIG. 12, in some aspects, process 1200 may include transmitting an SSB burst set that includes a plurality of SSBs, a majority of the SSBs in the SSB burst set having an SSB symbol and a corresponding PBCH symbol that is located the fixed number of symbols from the SSB symbol (block 1220). For example, the network entity (e.g., using communication manager 150 and/or transmission component 1404, depicted in FIG. 14) may transmit an SSB burst set that includes a plurality of SSBs, a majority of the SSBs in the SSB burst set having an SSB symbol and a corresponding PBCH symbol that is located the fixed number of symbols from the SSB symbol, as described above.

Process 1200 may include additional aspects, such as any single aspect or any combination of aspects described below and/or in connection with one or more other processes described elsewhere herein.

In a first aspect, the SSB burst set includes a plurality of SSBs, and wherein each SSB of the plurality of SSBs has an SSB symbol and a corresponding PBCH symbol that is located the fixed number of symbols from the SSB symbol.

In a second aspect, alone or in combination with the first aspect, the SSB burst set includes a plurality of SSBs, and wherein a majority of the SSBs, of the plurality of SSBs, have an SSB symbol and a corresponding PBCH symbol that is located the fixed number of symbols from the SSB symbol.

In a third aspect, alone or in combination with one or more of the first and second aspects, the SSB burst set includes four SSBs, and wherein three of the SSBs have an SSB symbol and a corresponding PBCH symbol that is located the fixed number of symbols from the SSB symbol.

In a fourth aspect, alone or in combination with one or more of the first through third aspects, the three SSBs are a first SSB, a third SSB, and a fourth SSB of the SSB burst set.

In a fifth aspect, alone or in combination with one or more of the first through fourth aspects, one or more other symbols are located between the SSB symbol and the corresponding PBCH symbol.

In a sixth aspect, alone or in combination with one or more of the first through fifth aspects, the corresponding PBCH symbol that is located the fixed number of symbols from the SSB symbol is located the fixed number of symbols before the SSB symbol or the fixed number of symbols after the SSB symbol.

In a seventh aspect, alone or in combination with one or more of the first through sixth aspects, the fixed number of symbols is based at least in part on a distance between a first SSB symbol of an SSB and a first PBCH symbol of a corresponding PBCH.

In an eighth aspect, alone or in combination with one or more of the first through seventh aspects, the fixed number of symbols is a first fixed number of symbols based at least in part on an operating frequency being less than or equal to an operating frequency threshold, or a second fixed number of symbols based at least in part on the operating frequency being greater than the operating frequency threshold.

In a ninth aspect, alone or in combination with one or more of the first through eighth aspects, the first fixed number of symbols is 28 symbols, the second fixed number of symbols is 56 symbols, and the operating frequency threshold is 3 GHz.

In a tenth aspect, alone or in combination with one or more of the first through ninth aspects, process 1200 includes receiving an indication that one or more neighboring cells are transmitting a subset of SSBs that is less than a total fixed number of possible SSBs in the SSB burst set.

In an eleventh aspect, alone or in combination with one or more of the first through tenth aspects, each SSB of the subset of SSBs has an SSB symbol and a corresponding PBCH symbol that is located the fixed number of symbols from the SSB symbol.

In a twelfth aspect, alone or in combination with one or more of the first through eleventh aspects, the receiving the indication comprises receiving system information, uplink control information, a medium access control message, or a radio resource control message that includes the indication.

In a thirteenth aspect, alone or in combination with one or more of the first through twelfth aspects, the indication indicates an SSB index associated with each SSB in the subset of SSBs.

In a fourteenth aspect, alone or in combination with one or more of the first through thirteenth aspects, the corresponding PBCH symbol overlaps with a symbol that is used for communicating a cell specific signal associated with the network entity.

In a fifteenth aspect, alone or in combination with one or more of the first through fourteenth aspects, process 1200 includes transmitting physical downlink control channel information or physical downlink shared channel information in the corresponding PBCH symbol, and transmitting an instruction to rate match around one or more tones that include PBCH information.

In a sixteenth aspect, alone or in combination with one or more of the first through fifteenth aspects, transmitting the SSB burst set comprises transmitting the SSB burst set to a reduced capability user equipment.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
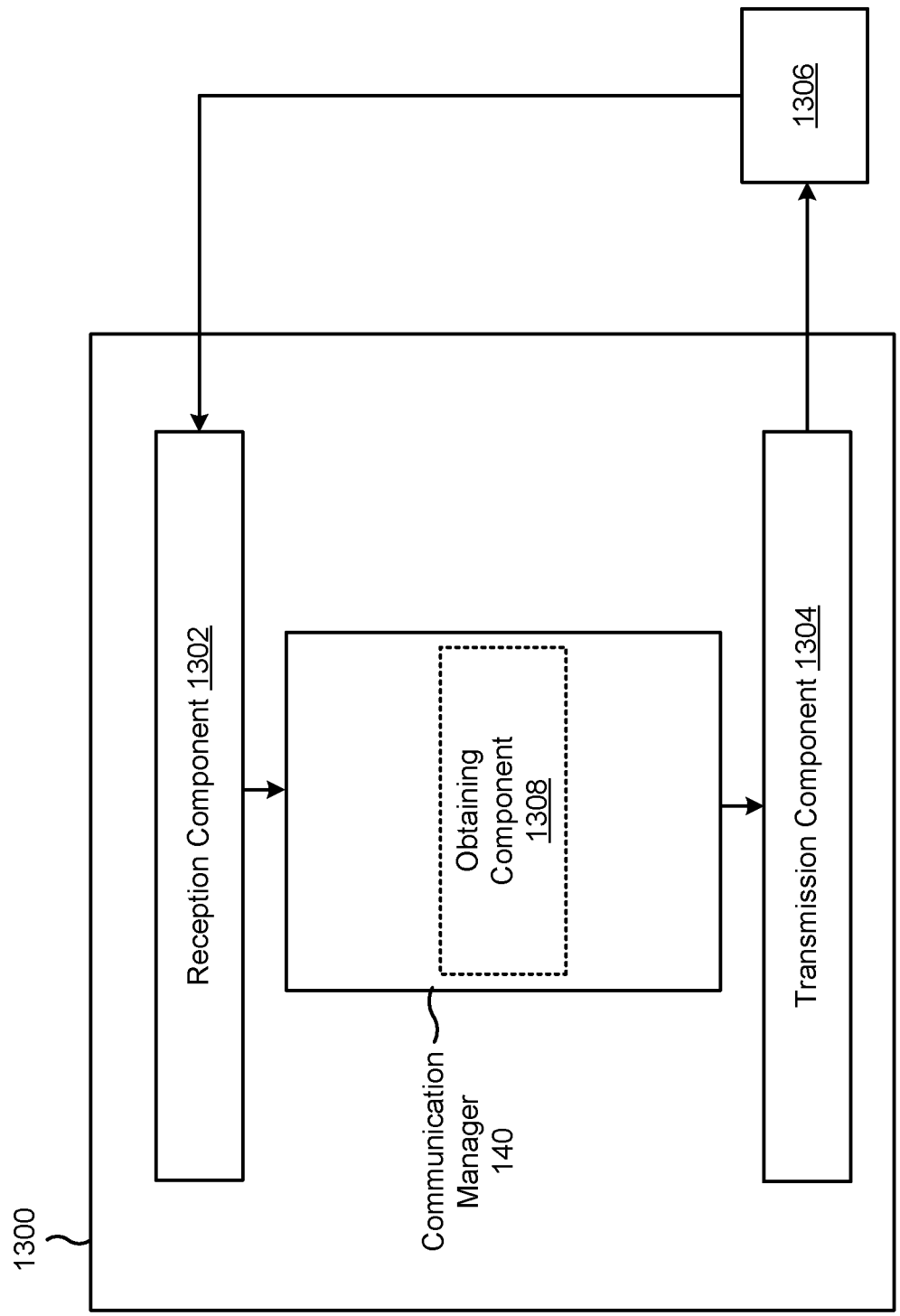
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include an obtaining component 1308 among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive a SSB burst set that includes a plurality of SSBs, a majority of the SSBs in the SSB burst set having an SSB symbol and a corresponding PBCH symbol that is located a fixed number of symbols from the SSB symbol. The obtaining component 1308 may obtain a location of the PBCH symbol based at least in part on the fixed number of symbols.

The transmission component 1304 may transmit an indication that one or more neighboring cells are transmitting a subset of SSBs that is less than a total fixed number of possible SSBs in the SSB burst set.

The reception component 1302 may receive physical downlink control channel information or physical downlink shared channel information in the corresponding PBCH symbol, and receiving an instruction to rate match around one or more tones that include PBCH information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
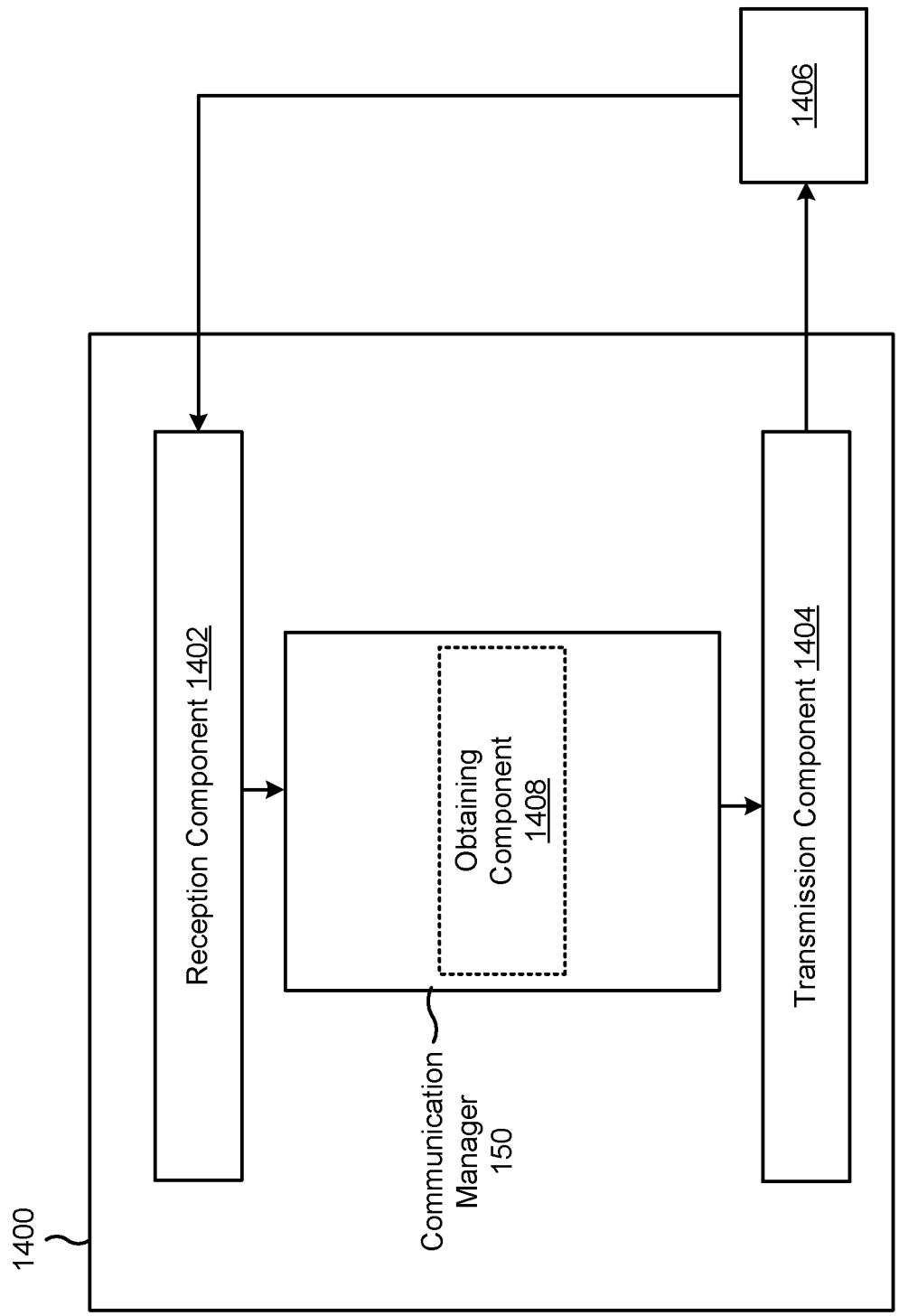
FIG. 14 is a diagram of an example apparatus for wireless communication, in accordance with the present disclosure.

FIG. 14 is a diagram of an example apparatus 1400 for wireless communication. The apparatus 1400 may be a network entity, or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include an obtaining component 1408, among other examples.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The reception component 1402 may receive a SSB burst set that includes a plurality of SSBs, a majority of the SSBs in the SSB burst set having an SSB symbol and a corresponding PBCH symbol that is located a fixed number of symbols from the SSB symbol. The obtaining component 1408 may obtain a location of the PBCH symbol based at least in part on the fixed number of symbols.

The transmission component 1404 may transmit an indication that one or more neighboring cells are transmitting a subset of SSBs that is less than a total fixed number of possible SSBs in the SSB burst set.

The reception component 1402 may receive physical downlink control channel information or physical downlink shared channel information in the corresponding PBCH symbol, and receiving an instruction to rate match around one or more tones that include PBCH information.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a synchronization signal block (SSB) burst set that includes a plurality of SSBs, a majority of the SSBs in the SSB burst set having an SSB symbol and a corresponding physical broadcast channel (PBCH) symbol that is located a fixed number of symbols from the SSB symbol; and obtaining a location of the PBCH symbol based at least in part on the fixed number of symbols.

Aspect 2: The method of Aspect 1, wherein the majority of the SSBs in the SSB burst set includes all of the SSBs in the SSB burst set.

Aspect 3: The method of Aspect 1, wherein the majority of the SSBs in the SSB burst set includes more than half of the SSBs in the SSB burst set.

Aspect 4: The method of any of Aspects 1-3, wherein the plurality of SSBs is four SSBs and the majority of the SSBs in the SSB burst set is three SSBs.

Aspect 5: The method of Aspect 4, wherein the three SSBs are a first SSB, a third SSB, and a fourth SSB of the SSB burst set.

Aspect 6: The method of any of Aspects 1-5, wherein one or more other symbols are located between the SSB symbol and the corresponding PBCH symbol.

Aspect 7: The method of any of Aspects 1-6, wherein the corresponding PBCH symbol that is located the fixed number of symbols from the SSB symbol is located the fixed number of symbols before the SSB symbol or the fixed number of symbols after the SSB symbol.

Aspect 8: The method of any of Aspects 1-7, wherein the fixed number of symbols is based at least in part on a distance between a first SSB symbol of an SSB and a first PBCH symbol of a corresponding PBCH.

Aspect 9: The method of any of Aspects 1-8, wherein the fixed number of symbols is a first fixed number of symbols based at least in part on an operating frequency being less than or equal to an operating frequency threshold, or a second fixed number of symbols based at least in part on the operating frequency being greater than the operating frequency threshold.

Aspect 10: The method of Aspect 9, wherein the first fixed number of symbols is 28 symbols, the second fixed number of symbols is 56 symbols, and the operating frequency threshold is 3 GHz.

Aspect 11: The method of any of Aspects 1-10, further comprising receiving an indication that one or more neighboring cells are transmitting a subset of SSBs that is less than a total fixed number of possible SSBs in the SSB burst set.

Aspect 12: The method of Aspect 11, wherein each SSB of the subset of SSBs has an SSB symbol and a corresponding PBCH symbol that is located the fixed number of symbols from the SSB symbol.

Aspect 13: The method of Aspect 11, wherein the receiving the indication comprises receiving system information, uplink control information, a medium access control message, or a radio resource control message that includes the indication.

Aspect 14: The method of Aspect 11, wherein the indication indicates an SSB index associated with each SSB in the subset of SSBs.

Aspect 15: The method of any of Aspects 1-14, wherein the corresponding PBCH symbol overlaps with a symbol that is used for communicating a cell specific signal.

Aspect 16: The method of any of Aspects 1-15, further comprising receiving physical downlink control channel information or physical downlink shared channel information in the corresponding PBCH symbol, and receiving an instruction to rate match around one or more tones that include PBCH information.

Aspect 17: The method of any of Aspects 1-16, wherein the obtaining the location of the PBCH symbol comprises obtaining the location of the PBCH symbol using a single hypothesis.

Aspect 18: The method of any of Aspects 1-17, wherein the UE is a reduced capability UE.

Aspect 19: A method of wireless communication performed by a network entity, comprising: obtaining an indication of a fixed number of symbols between a synchronization signal block (SSB) symbol and a corresponding physical broadcast channel (PBCH) symbol for a PBCH that is associated with the SSB; and transmitting an SSB burst set that includes a plurality of SSBs, a majority of the SSBs in the SSB burst set having an SSB symbol and a corresponding PBCH symbol that is located the fixed number of symbols from the SSB symbol.

Aspect 20: The method of Aspect 19, wherein transmitting the SSB burst set comprises: transmitting a first set of tones to a first UE via the SSB symbol; and transmitting a second set of tones to a second UE via the SSB symbol and the corresponding PBCH symbol, wherein the second set of tones is a subset of the first set of tones.

Aspect 21: The method of Aspect 20, wherein the first set of tones includes first information and the second set of tones includes second information that is the same as the first information.

Aspect 22: The method of any of Aspects 19-21, wherein the majority of the SSBs in the SSB burst set includes all of the SSBs in the SSB burst set.

Aspect 23: The method of any of Aspects 19-21, wherein the majority of the SSBs in the SSB burst set includes more than half of the SSBs in the SSB burst set.

Aspect 24: The method of any of Aspects 19-23, wherein the plurality of SSBs is four SSBs and the majority of the SSBs in the SSB burst set is three SSBs.

Aspect 25: The method of Aspect 24, wherein the three SSBs are a first SSB, a third SSB, and a fourth SSB of the SSB burst set.

Aspect 26: The method of any of Aspects 19-25, wherein one or more other symbols are located between the SSB symbol and the corresponding PBCH symbol.

Aspect 27: The method of any of Aspects 19-26, wherein the corresponding PBCH symbol that is located the fixed number of symbols from the SSB symbol is located the fixed number of symbols before the SSB symbol or the fixed number of symbols after the SSB symbol.

Aspect 28: The method of any of Aspects 19-27, wherein the fixed number of symbols is based at least in part on a distance between a first SSB symbol of an SSB and a first PBCH symbol of a corresponding PBCH.

Aspect 29: The method of any of Aspects 19-28, wherein the fixed number of symbols is a first fixed number of symbols based at least in part on an operating frequency being less than or equal to an operating frequency threshold, or a second fixed number of symbols based at least in part on the operating frequency being greater than the operating frequency threshold.

Aspect 30: The method of Aspect 29, wherein the first fixed number of symbols is 28 symbols, the second fixed number of symbols is 56 symbols, and the operating frequency threshold is 3 GHz.

Aspect 31: The method of any of Aspects 19-30, further comprising transmitting an indication that one or more neighboring cells are transmitting a subset of SSBs that is less than a total fixed number of possible SSBs in the SSB burst set.

Aspect 32: The method of Aspect 31, wherein each SSB of the subset of SSBs has an SSB symbol and a corresponding PBCH symbol that is located the fixed number of symbols from the SSB symbol.

Aspect 33: The method of Aspect 31, wherein the transmitting the indication comprises transmitting system information, uplink control information, a medium access control message, or a radio resource control message that includes the indication.

Aspect 34: The method of Aspect 31, wherein the indication indicates an SSB index associated with each SSB in the subset of SSBs.

Aspect 35: The method of any of Aspects 19-34, wherein the corresponding PBCH symbol overlaps with a symbol that is used for communicating a cell specific signal associated with the network entity.

Aspect 36: The method of any of Aspects 19-35, further comprising transmitting physical downlink control channel information or physical downlink shared channel information in the corresponding PBCH symbol, and transmitting an instruction to rate match around one or more tones that include PBCH information.

Aspect 37: The method of any of Aspects 19-36, wherein transmitting the SSB burst set comprises transmitting the SSB burst set to a reduced capability user equipment.

Aspect 38: An apparatus for wireless communication at a device, comprising a processor; memory coupled with the processor; and instructions stored in the memory and executable by the processor to cause the apparatus to perform the method of one or more of Aspects 1-18.

Aspect 39: A device for wireless communication, comprising memory, and one or more processors coupled to the memory, the memory comprising instructions executable by the one or more processors to cause the device to perform the method of one or more of Aspects 1-18.

Aspect 40: A device for wireless communication, comprising a memory and one or more processors coupled to the memory, the one or more processors configured to perform the method of one or more of Aspects 1-18.

Aspect 41: An apparatus for wireless communication, comprising at least one means for performing the method of one or more of Aspects 1-18.

Aspect 42: A non-transitory computer-readable medium storing code for wireless communication, the code comprising instructions executable by a processor to perform the method of one or more of Aspects 1-18.

Aspect 43: A non-transitory computer-readable medium storing a set of instructions for wireless communication, the set of instructions comprising one or more instructions that, when executed by one or more processors of a device, cause the device to perform the method of one or more of Aspects 1-18.

Aspect 44: An apparatus for wireless communication at a device, comprising a processor; memory coupled with the processor; and instructions stored in the memory and executable by the processor to cause the apparatus to perform the method of one or more of Aspects 19-37.

Aspect 45: A device for wireless communication, comprising memory, and one or more processors coupled to the memory, the memory comprising instructions executable by the one or more processors to cause the device to perform the method of one or more of Aspects 19-37.

Aspect 46: A device for wireless communication, comprising a memory and one or more processors coupled to the memory, the one or more processors configured to perform the method of one or more of Aspects 19-37.

Aspect 47: An apparatus for wireless communication, comprising at least one means for performing the method of one or more of Aspects 19-37.

Aspect 48: A non-transitory computer-readable medium storing code for wireless communication, the code comprising instructions executable by a processor to perform the method of one or more of Aspects 19-37.

Aspect 49: A non-transitory computer-readable medium storing a set of instructions for wireless communication, the set of instructions comprising one or more instructions that, when executed by one or more processors of a device, cause the device to perform the method of one or more of Aspects 19-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more memories storing instructions configurable to be executed by the one or more processors to cause the UE to:
receive a synchronization signal block (SSB) burst set that includes a plurality of SSBs, a majority of SSBs in the SSB burst set having an SSB symbol and a corresponding physical broadcast channel (PBCH) symbol that is located a fixed number of symbols from the SSB symbol;
obtain a location of the corresponding PBCH symbol based at least in part on the fixed number of symbols;
receive physical downlink control channel information or physical downlink shared channel information in the corresponding PBCH symbol; and receive an instruction to rate match around one or more tones that include PBCH information, wherein the PBCH information is associated with an SSB of the plurality of SSBs.

2. The UE of claim 1, wherein the majority of SSBs in the SSB burst set includes all of the SSBs in the SSB burst set.

3. The UE of claim 1, wherein the majority of SSBs in the SSB burst set includes more than half of the SSBs in the SSB burst set.

4. The UE of claim 1, wherein the plurality of SSBs is four SSBs and the majority of SSBs in the SSB burst set is three SSBs.

5. The UE of claim 4, wherein the three SSBs are a first SSB, a third SSB, and a fourth SSB of the SSB burst set.

6. The UE of claim 1, wherein one or more other symbols are located between the SSB symbol and the corresponding PBCH symbol.

7. The UE of claim 1, wherein the corresponding PBCH symbol that is located the fixed number of symbols from the SSB symbol is located the fixed number of symbols before the SSB symbol or the fixed number of symbols after the SSB symbol.

8. The UE of claim 1, wherein the fixed number of symbols is based at least in part on a distance between a first SSB symbol of the SSB and a first PBCH symbol of a corresponding PBCH.

9. The UE of claim 1, wherein the fixed number of symbols is a first fixed number of symbols based at least in part on an operating frequency being less than or equal to an operating frequency threshold, or a second fixed number of symbols based at least in part on the operating frequency being greater than the operating frequency threshold.

10. The UE of claim 1, wherein the instructions configurable to be executed are further executable by the one or more processors to cause the UE to receive an indication that one or more neighboring cells are transmitting a subset of SSBs that is less than a total fixed number of possible SSBs in the SSB burst set.

11. The UE of claim 1, wherein the corresponding PBCH symbol overlaps with a symbol that is used for communicating a cell specific signal.

12. A network entity for wireless communication, comprising:
one or more memories; and
one or more processors coupled to the one or more memories, the one or more memories storing instructions configurable to be executed by the one or more processors to cause the network entity to:
obtain an indication of a fixed number of symbols between a synchronization signal block (SSB) symbol and a corresponding physical broadcast channel (PBCH) symbol for a PBCH that is associated with the SSB symbol;
transmit an SSB burst set that includes a plurality of SSBs, a majority of SSBs in the SSB burst set having an SSB symbol and a corresponding PBCH symbol that is located the fixed number of symbols from the SSB symbol;
transmit physical downlink control channel information or physical downlink shared channel information in the corresponding PBCH symbol; and
transmit an instruction to rate match around one or more tones that include PBCH information, wherein the PBCH information is associated with an SSB of the plurality of SSBs.

13. The network entity of claim 12, wherein the instructions, configurable to be executed are further executable by the one or more processors to cause the network entity to transmit the SSB burst set, are executable to cause the network entity to:
transmit a first set of tones to a first UE via the SSB symbol; and
transmit a second set of tones to a second UE via the SSB symbol and the corresponding PBCH symbol, wherein the second set of tones is a subset of the first set of tones.

14. The network entity of claim 13, wherein the first set of tones includes first information and the second set of tones includes second information that is the same as the first information.

15. The network entity of claim 12, wherein the majority of SSBs in the SSB burst set includes all of the SSBs in the SSB burst set.

16. The network entity of claim 12, wherein the majority of SSBs in the SSB burst set includes more than half of the SSBs in the SSB burst set.

17. The network entity of claim 12, wherein the plurality of SSBs is four SSBs and the majority of SSBs in the SSB burst set is three SSBs.

18. The network entity of claim 17, wherein the three SSBs are a first SSB, a third SSB, and a fourth SSB of the SSB burst set.

19. The network entity of claim 12, wherein one or more other symbols are located between the SSB symbol and the corresponding PBCH symbol.

20. The network entity of claim 12, wherein the corresponding PBCH symbol that is located the fixed number of symbols from the SSB symbol is located the fixed number of symbols before the SSB symbol or the fixed number of symbols after the SSB symbol.

21. The network entity of claim 12, wherein the fixed number of symbols is based at least in part on a distance between a first SSB symbol of the SSB and a first PBCH symbol of a corresponding PBCH.

22. The network entity of claim 12, wherein the fixed number of symbols is a first fixed number of symbols based at least in part on an operating frequency being less than or equal to an operating frequency threshold, or a second fixed number of symbols based at least in part on the operating frequency being greater than the operating frequency threshold.

23. The network entity of claim 12, wherein the instructions configurable to be executed are further executable by the one or more processors to cause the network entity to transmit an indication that one or more neighboring cells are transmitting a subset of SSBs that is less than a total fixed number of possible SSBs in the SSB burst set.

24. A method of wireless communication performed by a user equipment (UE), comprising:
receiving a synchronization signal block (SSB) burst set that includes a plurality of SSBs, a majority of SSBs in the SSB burst set having an SSB symbol and a corresponding physical broadcast channel (PBCH) symbol that is located a fixed number of symbols from the SSB symbol;
obtaining a location of the corresponding PBCH symbol based at least in part on the fixed number of symbols;
receiving physical downlink control channel information or physical downlink shared channel information in the corresponding PBCH symbol; and
receiving an instruction to rate match around one or more tones that include PBCH information, wherein the PBCH information is associated with an SSB of the plurality of SSBs.

25. The method of claim 24, wherein the majority of SSBs in the SSB burst set includes all of the SSBs in the SSB burst set.

26. The method of claim 24, wherein the majority of SSBs in the SSB burst set includes more than half of the SSBs in the SSB burst set.

27. A method of wireless communication performed by a network entity, comprising:
- obtaining an indication of a fixed number of symbols between a synchronization signal block (SSB) symbol and a corresponding physical broadcast channel (PBCH) symbol for a PBCH that is associated with the SSB symbol, wherein the fixed number of symbols is based at least in part on an operating frequency threshold;
- transmitting an SSB burst set that includes a plurality of SSBs, a majority of SSBs in the SSB burst set having an SSB symbol and a corresponding PBCH symbol that is located the fixed number of symbols from the SSB symbol;
- transmitting physical downlink control channel information or physical downlink shared channel information in the corresponding PBCH symbol; and
- transmitting an instruction to rate match around one or more tones that include PBCH information, wherein the PBCH information is associated with an SSB of the plurality of SSBs.

28. The method of claim 27, wherein transmitting the SSB burst set comprises:
- transmitting a first set of tones to a first UE via the SSB symbol; and
- transmitting a second set of tones to a second UE via the SSB symbol and the corresponding PBCH symbol, wherein the second set of tones is a subset of the first set of tones.

29. The method of claim 28, wherein the first set of tones includes first information and the second set of tones includes second information that is the same as the first information.

* * * * *